US006991538B2

(12) United States Patent
Cannon

(10) Patent No.: US 6,991,538 B2
(45) Date of Patent: Jan. 31, 2006

(54) GAMING DEVICE HAVING A CARD GAME WITH NEGATIVE IMPACT CARDS

(75) Inventor: Lee E. Cannon, Carson City, NV (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 10/659,863

(22) Filed: Sep. 10, 2003

(65) Prior Publication Data

US 2005/0054409 A1 Mar. 10, 2005

(51) Int. Cl.
*A63F 13/00* (2006.01)

(52) U.S. Cl. ........................................................ 463/13

(58) Field of Classification Search .................. 463/13, 463/16–22, 25, 30–31, 40–42; 273/143 R, 273/292

See application file for complete search history.

(56) References Cited

U.S. PATENT DOCUMENTS 1,527,929 A 2/1925 Simons
2,545,644 A 3/1951 Benton
4,157,829 A 6/1979 Goldman et al.
4,198,052 A 4/1980 Gauselmann
4,258,919 A 3/1981 Martelli
4,335,809 A 6/1982 Wain
4,339,798 A 7/1982 Hedges et al.
4,467,424 A 8/1984 Hedges et al.
4,494,197 A 1/1985 Troy et al.
4,560,161 A 12/1985 Hamano
4,582,324 A 4/1986 Koza et al.
4,618,150 A 10/1986 Kimura
4,652,998 A 3/1987 Koza et al.
4,669,730 A 6/1987 Small
4,689,742 A 8/1987 Troy et al.
4,743,022 A 5/1988 Wood
4,805,907 A 2/1989 Hagiwara
4,815,741 A 3/1989 Small
4,817,951 A 4/1989 Crouch et al.
4,838,552 A 6/1989 Hagiwara
4,842,278 A 6/1989 Markowicz (Continued)

FOREIGN PATENT DOCUMENTS

EP 0 333 338 A2 9/1989

(Continued)

OTHER PUBLICATIONS

3 Way-Action Poker Advertisement, written by International Game Technology, published in 2001 and 2002.

(Continued)

*Primary Examiner*—Kim Nguyen
(74) *Attorney, Agent, or Firm*—Bell, Boyd & Lloyd LLC

(57) ABSTRACT

A gaming device having a poker game including at least one card in addition to a conventional fifty-two card deck which has a negative impact on the hand held by the player. In one embodiment, the negative impact card is not considered when determining if a winning combination exists. Additional embodiments include an inability to discard the negative impact card requiring the player to play for a winning combination among four, rather than five, cards. In an alternative embodiment, the player must decide whether to discard a card without knowing if it is a positive or negative impact card. Whether the card is a positive or negative impact card is not revealed to the player until after the first draw. The negative impact card can be used in all poker games and other card games where the player has a limited number of cards from which to determine a win.

43 Claims, 19 Drawing Sheets

U.S. PATENT DOCUMENTS

| | | | |
|---|---|---|---|
| 4,856,787 | A | 8/1989 | Itkis |
| 4,926,327 | A | 5/1990 | Sidley |
| 4,982,337 | A | 1/1991 | Burr et al. |
| 5,014,991 | A | 5/1991 | Mirando et al. |
| 5,019,973 | A | 5/1991 | Wilcox et al. |
| 5,042,809 | A | 8/1991 | Richardson |
| 5,046,736 | A | 9/1991 | Bridgeman et al. |
| 5,085,436 | A | 2/1992 | Bennett |
| 5,092,598 | A | 3/1992 | Kamille |
| 5,100,137 | A | 3/1992 | Fulton |
| 5,158,293 | A | 10/1992 | Mullins |
| 5,167,413 | A | 12/1992 | Fulton |
| 5,188,363 | A | 2/1993 | Marnell et al. |
| 5,209,479 | A | 5/1993 | Nagao et al. |
| 5,211,399 | A | 5/1993 | Howard |
| 5,251,897 | A | 10/1993 | Fulton |
| 5,255,915 | A | 10/1993 | Miller |
| 5,265,874 | A | 11/1993 | Dickinson et al. |
| 5,275,400 | A | 1/1994 | Weingardt et al. |
| 5,276,312 | A | 1/1994 | McCarthy |
| 5,282,620 | A | 2/1994 | Keesee |
| 5,294,120 | A | 3/1994 | Schultz |
| 5,308,065 | A | 5/1994 | Bridgeman et al. |
| 5,324,035 | A | 6/1994 | Morris et al. |
| 5,332,219 | A | 7/1994 | Marnell, II et al. |
| 5,332,228 | A | 7/1994 | Schultz |
| 5,364,100 | A | 11/1994 | Ludlow et al. |
| 5,393,061 | A | 2/1995 | Manship et al. |
| 5,395,111 | A | 3/1995 | Inoue |
| 5,398,932 | A | 3/1995 | Eberhardt et al. |
| 5,407,199 | A | 4/1995 | Gumina |
| 5,411,257 | A | 5/1995 | Fulton |
| 5,429,507 | A | 7/1995 | Kaplan |
| 5,437,451 | A | 8/1995 | Fulton |
| 5,486,005 | A | 1/1996 | Neal |
| 5,489,101 | A | 2/1996 | Moody |
| 5,525,915 | A | 6/1996 | Farquhar et al. |
| 5,531,448 | A | 7/1996 | Moody |
| 5,542,669 | A | 8/1996 | Charron et al. |
| 5,628,684 | A | 5/1997 | Bouedec |
| 5,630,754 | A | 5/1997 | Rebane |
| 5,655,965 | A | 8/1997 | Takemoto et al. |
| 5,664,781 | A | 9/1997 | Feola |
| 5,674,128 | A | 10/1997 | Holch et al. |
| 5,678,821 | A | 10/1997 | Hedman |
| 5,722,891 | A | 3/1998 | Inoue |
| 5,732,950 | A | 3/1998 | Moody |
| 5,752,881 | A | 5/1998 | Inoue |
| 5,755,621 | A | 5/1998 | Marks et al. |
| 5,769,716 | A | 6/1998 | Saffari et al. |
| 5,779,545 | A | 7/1998 | Berg et al. |
| 5,800,269 | A | 9/1998 | Holch et al. |
| 5,803,809 | A | 9/1998 | Yoseloff |
| 5,807,172 | A | 9/1998 | Piechowiak |
| 5,810,354 | A | 9/1998 | Banyai |
| 5,816,916 | A | 10/1998 | Moody |
| 5,820,460 | A | 10/1998 | Fulton |
| 5,823,873 | A | 10/1998 | Moody |
| 5,833,536 | A | 11/1998 | Davids et al. |
| 5,871,398 | A | 2/1999 | Schneier et al. |
| 5,882,259 | A | 3/1999 | Holmes, Jr. et al. |
| 5,890,962 | A | 4/1999 | Takemoto |
| 5,919,089 | A | 7/1999 | Rosati |
| 5,941,770 | A | 8/1999 | Miers et al. |
| 5,944,314 | A | 8/1999 | Stavinsky |
| 5,944,606 | A | 8/1999 | Gerow |
| 5,949,042 | A | 9/1999 | Dietz, II et al. |
| 5,954,582 | A | 9/1999 | Zach |
| 5,971,849 | A | 10/1999 | Falciglia |
| 5,984,309 | A | 11/1999 | Santin |
| 5,984,781 | A | 11/1999 | Sunaga |
| 5,988,643 | A | 11/1999 | Awada |
| 5,997,401 | A | 12/1999 | Crawford |
| 6,007,066 | A | 12/1999 | Moody |
| 6,015,346 | A | 1/2000 | Bennett |
| 6,017,032 | A | 1/2000 | Grippo et al. |
| 6,024,640 | A | 2/2000 | Walker et al. |
| 6,045,129 | A | 4/2000 | Cooper et al. |
| 6,086,066 | A | 7/2000 | Takeuchi et al. |
| 6,089,976 | A | 7/2000 | Schneider et al. |
| 6,089,982 | A | 7/2000 | Holch et al. |
| 6,098,985 | A | 8/2000 | Moody |
| 6,110,040 | A | 8/2000 | Sanduski et al. |
| 6,120,378 | A | 9/2000 | Moody et al. |
| 6,126,542 | A | 10/2000 | Fier |
| 6,129,357 | A | 10/2000 | Wichinsky |
| 6,132,311 | A | 10/2000 | Williams |
| 6,135,882 | A | 10/2000 | Kadlic |
| 6,135,883 | A | 10/2000 | Hachquet |
| 6,142,874 | A | 11/2000 | Kodachi et al. |
| 6,146,271 | A | 11/2000 | Kadlic |
| 6,146,272 | A | 11/2000 | Walker et al. |
| 6,149,157 | A | 11/2000 | Suan |
| 6,149,521 | A | 11/2000 | Sanduski |
| 6,155,568 | A | 12/2000 | Franklin |
| 6,159,095 | A | 12/2000 | Frohm et al. |
| 6,159,098 | A | 12/2000 | Slomiany et al. |
| 6,168,521 | B1 | 1/2001 | Luciano et al. |
| 6,174,233 | B1 | 1/2001 | Sunaga et al. |
| 6,179,293 | B1 | 1/2001 | Hedman |
| 6,183,361 | B1 | 2/2001 | Cummings et al. |
| 6,190,254 | B1 | 2/2001 | Bennett |
| 6,190,255 | B1 | 2/2001 | Thomas et al. |
| 6,200,217 | B1 | 3/2001 | Osawa |
| 6,203,428 | B1 | 3/2001 | Giobbi et al. |
| 6,206,374 | B1 | 3/2001 | Jones |
| 6,210,275 | B1 | 4/2001 | Olsen |
| 6,210,276 | B1 | 4/2001 | Mullins |
| 6,213,875 | B1 | 4/2001 | Suzuki |
| 6,217,448 | B1 | 4/2001 | Olsen |
| 6,220,959 | B1 | 4/2001 | Holmes, Jr. et al. |
| 6,220,960 | B1 | 4/2001 | Kryzhanovsky |
| 6,220,961 | B1 | 4/2001 | Keane et al. |
| 6,224,484 | B1 | 5/2001 | Okuda et al. |
| 6,227,970 | B1 | 5/2001 | Shimuzu et al. |
| 6,234,897 | B1 | 5/2001 | Frohm et al. |
| 6,238,287 | B1 | 5/2001 | Komori et al. |
| 6,241,606 | B1 | 6/2001 | Riendeau et al. |
| 6,241,607 | B1 | 6/2001 | Payne et al. |
| 6,251,013 | B1 | 6/2001 | Bennett |
| 6,254,480 | B1 | 7/2001 | Zach |
| 6,261,177 | B1 | 7/2001 | Bennett |
| 6,270,408 | B1 | 8/2001 | Sakamato et al. |
| 6,273,820 | B1 | 8/2001 | Haste, III |
| 6,280,328 | B1 | 8/2001 | Holch et al. |
| 6,287,194 | B1 | 9/2001 | Okada et al. |
| 6,290,600 | B1 | 9/2001 | Glasson |
| 6,299,165 | B1 | 10/2001 | Nagano |
| 6,309,298 | B1 | 10/2001 | Gerow |
| 6,309,300 | B1 | 10/2001 | Glavich |
| 6,315,663 | B1 | 11/2001 | Sakamoto |
| 6,315,664 | B1 | 11/2001 | Baerlocher et al. |
| 6,319,124 | B1 | 11/2001 | Baerlocher et al. |
| 6,325,716 | B1 | 12/2001 | Walker et al. |
| 6,334,613 | B1 | 1/2002 | Yoseloff |
| 6,342,007 | B1 | 1/2002 | Wood et al. |
| 6,346,043 | B1 | 2/2002 | Colin et al. |
| 6,347,996 | B1 | 2/2002 | Gilmore et al. |
| 6,358,144 | B1 * | 3/2002 | Kadlic et al. ................. 463/13 |
| 6,358,151 | B1 | 3/2002 | Enzminger et al. |
| 6,368,218 | B2 | 4/2002 | Angell, Jr. |
| 6,398,644 | B1 | 6/2002 | Perrie et al. |
| 6,402,614 | B1 | 6/2002 | Schneier et al. |
| 6,413,162 | B1 | 7/2002 | Baerlocher et al. |

| | | | |
|---|---|---|---|
| 6,419,579 | B1 | 7/2002 | Bennett |
| 6,419,583 | B1 | 7/2002 | Crumby et al. |
| 6,443,837 | B1 | 9/2002 | Jaffe et al. |
| 6,450,885 | B2 | 9/2002 | Schneier et al. |
| 6,454,648 | B1 | 9/2002 | Kelly et al. |
| RE37,885 | E | 10/2002 | Acres et al. |
| 6,457,714 | B1 | 10/2002 | Feola |
| 6,475,086 | B2 | 11/2002 | Zach |
| 6,508,711 | B1 | 1/2003 | Ono |
| 6,524,184 | B1 | 2/2003 | Lind et al. |
| 6,527,638 | B1 | 3/2003 | Walker et al. |
| 6,533,279 | B2 | 3/2003 | Moody et al. |
| 6,533,664 | B1 | 3/2003 | Crumby |
| 6,537,150 | B1 | 3/2003 | Luciano et al. |
| 6,561,897 | B1 | 5/2003 | Bourbour et al. |
| 6,569,013 | B1 | 5/2003 | Taylor |
| 2001/0009865 | A1 | 7/2001 | Demar et al. |
| 2002/0010013 | A1 | 1/2002 | Walker et al. |
| 2002/0072404 | A1 | 6/2002 | Gerow |
| 2002/0094857 | A1 | 7/2002 | Meyer |
| 2002/0098882 | A1 | 7/2002 | Lind et al. |
| 2002/0098883 | A1 | 7/2002 | Packes, Jr. et al. |
| 2002/0169018 | A1 | 11/2002 | Schneier et al. |
| 2003/0040352 | A1* | 2/2003 | Marks et al. ................. 463/13 |
| 2003/0189290 | A1* | 10/2003 | Moody ....................... 273/292 |
| 2004/0009803 | A1 | 1/2004 | Bennett et al. |

FOREIGN PATENT DOCUMENTS

| | | | |
|---|---|---|---|
| EP | 0 410 789 | A2 | 7/1990 |
| EP | 0 410 789 | A3 | 7/1990 |
| GB | 2 253 300 | A | 2/1992 |
| WO | WO 93/03464 | | 2/1993 |
| WO | WO 00/76606 | A1 | 12/2000 |
| WO | WO 02/38234 | | 10/2002 |

OTHER PUBLICATIONS

Anything's Wild Poker Advertisement, written by International Game Technology, published in 2003.

Austin Powers Mini Me Poker Advertisement, written by International Game Technology, published in 2001.

Austin Powers Poker Advertisement, written by International Game Technology, published in 2002.

Austin Powers Ten Play Number Two Article in Strictly Slots, published in Apr. 2002.

Big Split Poker Advertisement, written by International Game Technology, published in 2003.

Bonus Hand Triple Play Draw Poker Advertisements, written by International Game Technology, published in 2003.

Caribbean Poker Game Description, printed from www.gambling.org (website) on Feb. 17, 2003.

Caribbean Draw Poker Advertisement, written by Mikohn, published in 1999.

Caribbean Stud Poker, written by Mikohn, published in 2001.

Casino Hold 'Em Poker Advertisement, written by John Huxley, published prior to Sep., 2003.

Chase the Royal Advertisement, written by International Game Technology, published in 2001.

Classic Play Video Poker (see Jun. 2004 insert) Advertisement, written by Bally Gaming Systems, published in 2003.

Concentration Game Show descriptions (4), printed from various websites on Jun. 22, 2003.

Diamonopoly Advertisement, written by International Gamco, Inc., published in 2002.

Double Down Stud Poker Advertisements written by International Game Technology, published in 2003.

Double Pay Poker Advertisements, written by International Game Technology, published in 2001 and 2002.

Enchanted Unicorn Advertisement, written by International Game Technology, published in 2001.

Flex Play Poker Advertisement, written by International Game Technology, published in 2001.

Free Fall Poker Game Description, written by International Game Technology, published prior to Sep., 2003.

Free Ride Game Description and Rules, printed from www.play-free-ride.com (website) on Feb. 17, 2003.

Game King 4.3 Poker Advertisement, written by International Game Technology, published in 2002.

Game King 5.1 Poker Advertisement, written by International Game Technology, published in 2003 and 2004.

Game King Multi-Game 4.0 Poker Plus Advertisements, written by International Game Technology, published in 2002.

Game King Series Ten Play Draw Poker Advertisement, written by International Game Technology, published in 2001.

Game King Series Triple Play- Five Play Draw Poker Advertisement, written by International Game Technology, published in 2001.

Game King Video Poker Advertisement, written by International Game Technology, published in 2002.

Hoyle's Rules of Games—Poker Description, written by Morehead and Mott-Smith, published in 1983.

Instant Winner Advertisement, written by Williams/WMS Gaming, published prior to 2002.

Lucky Times California Lottery Newsletter, published in 1996.

Magic Seven Advertisement, written by Bestco, published prior to Sep., 2003.

Matrix Poker Advertisement, written by International Game Technology, published prior to Sep., 2003.

Max Out! Draw Poker IGT Slot Line Brochure, written by International Game Technology, published in 2003.

Milionaire Poker Advertisement, written by International Game Technology, published in 2001.

Multi Play Poker Advertisement, written by Bally Gaming Systems, published in 2000.

Multi-Strike Poker Advertisement, written by International Game Technology, published in 2003 and 2004.

Penguin Pays Article, written by Strictly Slots, published in Apr. 1999.

Pick'em Poker Plus Advertisement, written by Bally Gaming Systems, published in 2002.

Pick-A-Pay Pokler Advertisement, written by Bally Gaming Systems, published in 2002.

Play it again Advertisement, written by International Gamco, Inc., published in 2000.

Power Poker Advertisement, written by Bally Gaming Systems, published in 2002.

Slot Machines Article, written by Marshall Fey, published in 1983.

Super Cherry Advertisement, written by International Game Technology, published in 2001.

Time Bomb Poker Article in Strictly Slots, published in Apr. 2002.

Trade Up Poker IGT Slot Line Brochure, written by International Game Technology, published in Summer 2003.

Triple Play Draw Poker Advertisement, written by International Game Technology, published in 2000 and 2004.

Triple Play Draw Poker Advertisement, written by International Game Technology, published in 1998 and 2002.
Wheel Poker Article in Strictly Slots, published in Nov. 2000.
White Hot Aces Poker Advertisements in IGT Slot Line Brochure, written by International Game Technology, published in 1997, 2003 and 2004.
Bonus Poker Adverstisement, written by Cyberdyne Gaming, published prior to Sep., 2003.
Deuces Wild 5 Card Poker Advertisement, written by BCSI Corporation, published prior to Sep., 2003.
Double Bonus Poker Plus Article in Strictly Slots, published in Jan. 2003.
Draw Poker (Five Play, Triple Play, and Ten Play) Advertisement, written by International Game Technology, published in 2003.
Draw Poker Advertisements written by Cyberdyne Gaming, published prior to Sep., 2003.
Fast Action Triple Play Draw Poker Advertisement, written by International Game Technology, published in 2002.
Fifty Play Poker Advertisement, written by International Game Technology, published in 2001 and 2003.
Five Play Multi Strike Poker Advertisement, written by International Game Technology, published in 2003 and 2004.
Game King Poker Advertisement, written by International Game Technology, published in 2002.
Hold 'Em Challenge Multi-Hand Poker Advertisement, written by International Game Technology, published in 2003.
Hundred Play Draw Poker Advertisement, written by International Game Technology, published in 2001 and 2002.
Improve Your Hand Poker Advertisement, written by Bally Gaming Systems, published in 2002.
Joker Wild Poker Advertisement, written by International Game Technology/Smiling Ape, published prior to Sep., 2003.
One-Eyed Jacks Poker Article in Strctly Slots, published in Jan. 2003.
Pharaoh's Poker Advertisement, written by Ainsworth Game Technology, published prior to Sep., 2003.
Super Double Double Bonus Poker Article in Strictly Slots, published in Jan. 2003.
Super Times Pay Poker Advertisement, written by International Game Technology, published in 2003 and 2004.
Triple Action Poker Article in Strictly Slots, published in 2003.

* cited by examiner

FIG. 3

| PAYS | | Number of Cards Needed for Win |
|---|---|---|
| ROYAL FLUSH | - 1000 CREDITS | - 5 CARDS |
| STRAIGHT FLUSH | - 50 CREDITS | - 5 CARDS |
| 4 OF A KIND | - 40 CREDITS | - 4 CARDS |
| FULL HOUSE | - 30 CREDITS | - 5 CARDS |
| FLUSH | - 20 CREDITS | - 5 CARDS |
| STRAIGHT | - 10 CREDITS | - 5 CARDS |
| 3 OF A KIND | - 5 CREDITS | - 3 CARDS |
| 2 PAIRS | - 3 CREDITS | - 4 CARDS |
| PAIR OF ACES | - 2 CREDITS | - 2 CARDS |

FIG. 10

WAGERS

| | |
|---|---|
| INITIAL | - 1 CREDIT |
| 1st REPLACED CARD | - 1 CREDIT |
| 2nd REPLACED CARD | - 2 CREDITS |
| 3rd REPLACED CARD | - 4 CREDITS |
| 4th REPLACED CARD | - 8 CREDITS |
| 5th REPLACED CARD | - 16 CREDITS |
| TOTAL FOR FIVE CARDS | - 32 CREDITS |
| NEGATIVE IMPACT CARD | - 16 CREDITS |

GAMING DEVICE HAVING A CARD GAME WITH NEGATIVE IMPACT CARDS

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to a poker game with one or more cards having a negative impact on a hand in the game.

Gaming device manufacturers strive to make gaming devices that provide as much enjoyment and excitement as possible. Wagering machines such as slot machines are games of luck demanding minimal skill from the player. Card games such as blackjack and poker, however, include luck and a reasonable amount of strategy or knowledge of the game. For instance, the player is lucky to receive four aces in poker. The player should also know that it is unwise to forego three-of-a-kind to play for a straight in poker or split two tens in blackjack.

Video poker machines used for gaming are well known in the art. Most conventional video poker gaming machines used in casinos implement conventional rules for poker by dealing five initial cards face up from a standard deck of fifty-two cards and allowing the player to hold any number of the dealt cards. The player can press a draw button which causes the non-held or discarded cards to be replaced with new cards from the deck. The player is provided an award for a winning hand, if any, according to a payout table. In a conventional poker game, each and every card in a fifty-two-card deck can be a part of a winning hand if it is the highest-valued hand obtained. Even a card such as a two, which, alone, is of low value, can be valuable if it is drawn with other cards such as a three, four, five and six of the same suit—a straight flush. No card in the deck has a negative impact on the game.

A continuing need exists for different, interactive and enjoyable games which can add additional challenges to the player without increasing the level of difficulty beyond the ability of the average player to experience a sufficient level of success and enjoyment. A continuing need also exists to provide new, challenging and entertaining card games which are relatively easy to learn and play.

SUMMARY OF THE INVENTION

The present invention provides a standard deck of cards including one or more negative impact cards. The present invention can be employed as a gaming device or as a table game. In addition, the present invention can be employed as a primary wagering game or a secondary game such as a bonus game. Furthermore, the present invention can be employed in any suitable card game such as poker.

The present invention is described primarily with respect to a poker primary wagering game; however, it should be appreciated that the present invention can be employed as a secondary game and with other suitable card games. This game includes an actual or virtual deck of cards such as a conventional deck of fifty-two cards. Each card of the deck has multiple characteristics including a value and suit combination which is visible when the card is turned face up. The suits include thirteen cards of different values from each of the suits of spades, clubs, diamonds and hearts. The deck also includes at least one, or, alternatively, a plurality of negative impact cards.

In one embodiment, two cards such as jokers are included in the deck in addition to the typical fifty-two cards. The first joker or type of card has a positive impact on the game by acting as a wild card or any of the fifty-two cards for purposes of determining a winning combination or a combination of highest value in a hand. Additionally, the positive impact card, in one embodiment, includes a modifier which favorably modifies the ante pot if the player holds the winning hand. The second joker or type of card has a negative impact on the game by having no value and no use to form any winning combinations. Thus, if obtained by a player, it lessens the chances of the player having a winning combination in the hand.

In one embodiment of the poker game, once dealt to the player (initially or in a draw), the card is not able to be discarded. The negative impact card which cannot be discarded, therefore, prevents the player from obtaining any winning combination requiring more than four cards. It should be appreciated that the player can still obtain other winning combinations such as Four-of-a-Kind, Three-of-a-Kind, etc.

In another embodiment, such as upon a draw in a draw poker game, the player can discard the negative impact card. In such an embodiment, the negative impact card just lowers the chances of a player receiving a winning hand by decreasing the number of potentially winning cards the player is able to play.

Alternatively, the player is permitted to discard any card including the negative impact card under certain conditions such as the initial wager, an additional wager, a limited number of discards in the game or random selection of a card by the game.

In one embodiment, the player can discard the impact card, but will not know if the impact card is a positive or negative impact card when it is dealt. In one embodiment, both types of impact cards will appear the same when dealt. Whether the impact card is a positive or negative impact card is not revealed to the player until after the draw or until the player has chosen to keep or discard the impact card. It should be appreciated that the player may be dealt both types of cards in a single hand in the game.

In one embodiment of the present invention, the player makes a wager and is dealt a hand face up including five initial cards from a conventional virtual deck of fifty-two playing cards plus the two additional cards. The present invention first provides the player with an opportunity for a first draw as in a conventional poker game. The player chooses which initial cards to hold and is dealt replacement cards for the cards not held or discarded by the player. The player is then provided an award based on any winning combination of cards in the hand. Any of the discarding rules above may be employed in this draw poker game. It should also be appreciated that the present invention can be employed in multi-hand games as is understood by those of skill in the art.

It is therefore an advantage of the present invention to provide an entertaining and exciting card game.

It is still a further advantage of the present invention to provide an entertaining and exciting casino table game.

It is yet another advantage of the present invention to provide a new type of playing card with a new function to add additional challenge and excitement to a card game.

Additional features and advantages of the present invention are described in, and will be apparent from, the following Detailed Description of the Invention and the figures.

BRIEF DESCRIPTION OF THE FIGURES

FIG. 3 is a table of one embodiment of the present invention illustrating a paytable and the number of cards required for each winning combination of cards.

FIG. 10 is a table of one embodiment of the present invention illustrating an example distribution of wager amounts to replace cards.

DETAILED DESCRIPTION OF THE INVENTION

Gaming Device and Electronics

Figure 1A:
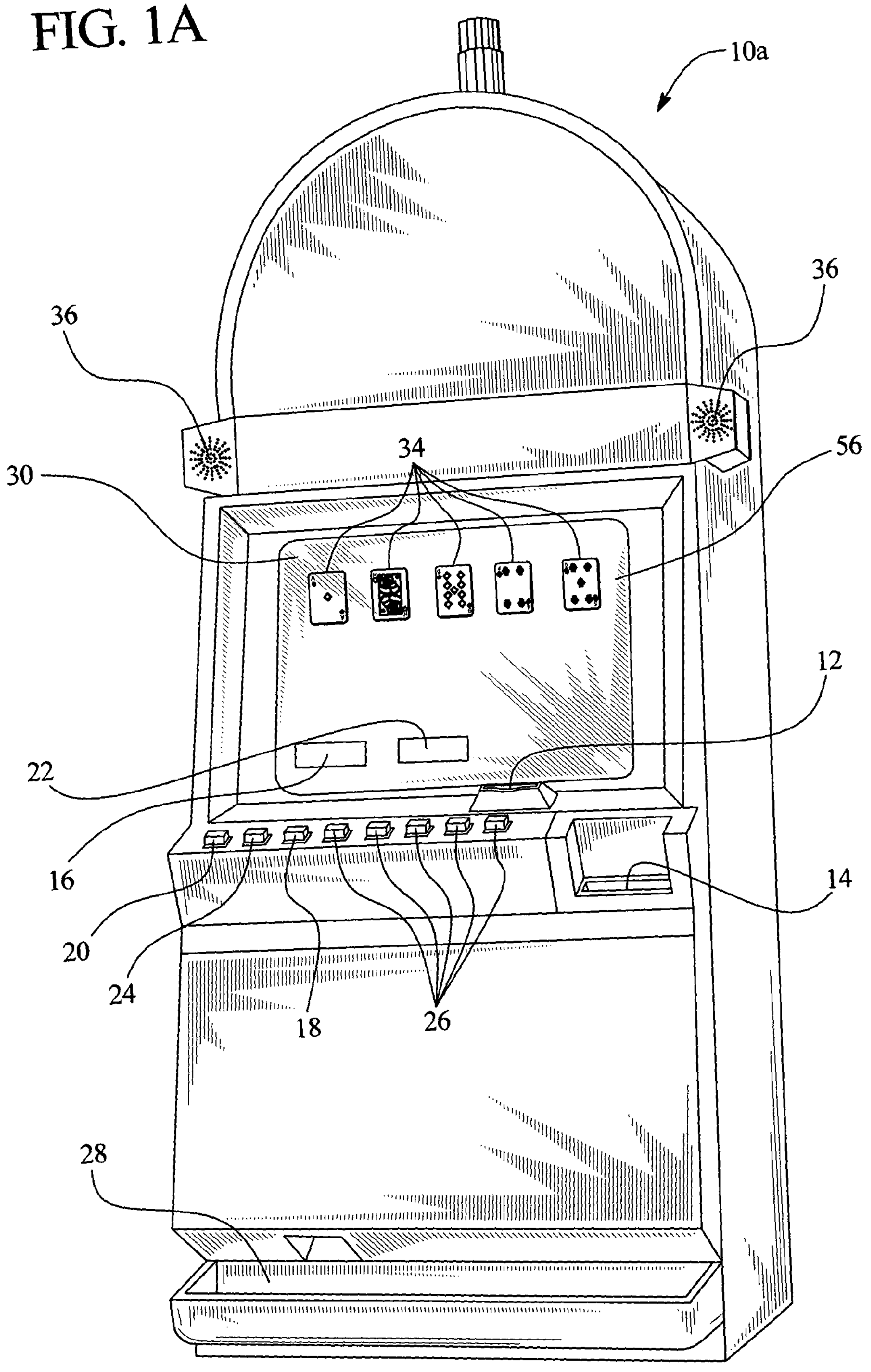
FIG. 1A is a front perspective view of one embodiment of the gaming device of the present invention.
Figure 1B:
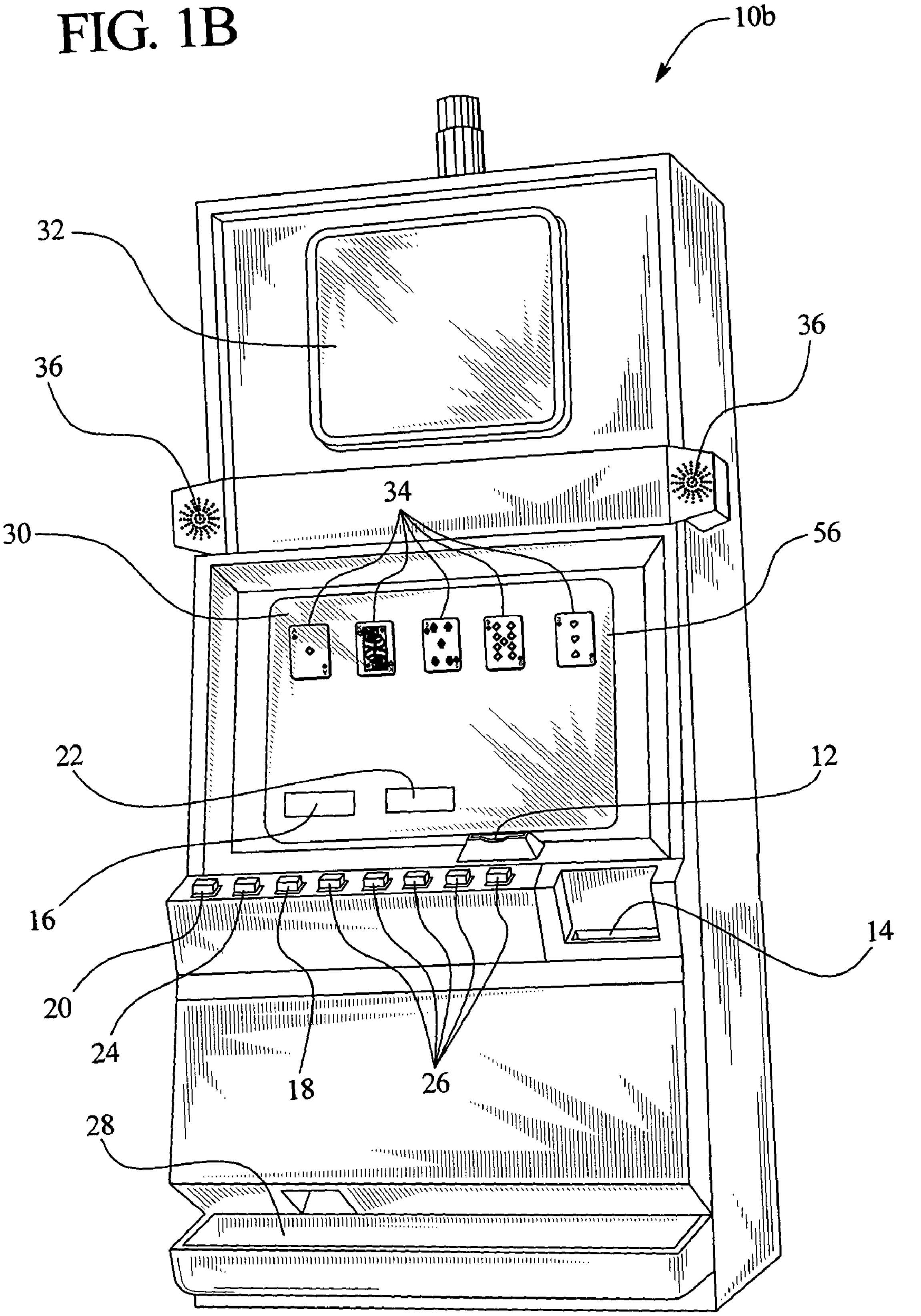
FIG. 1B is a front perspective view of another embodiment of the gaming device of the present invention.

Referring now to the drawings, two alternative embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10.

In one embodiment, as illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device can be constructed with varying cabinet and display configurations.

Figure 2A:
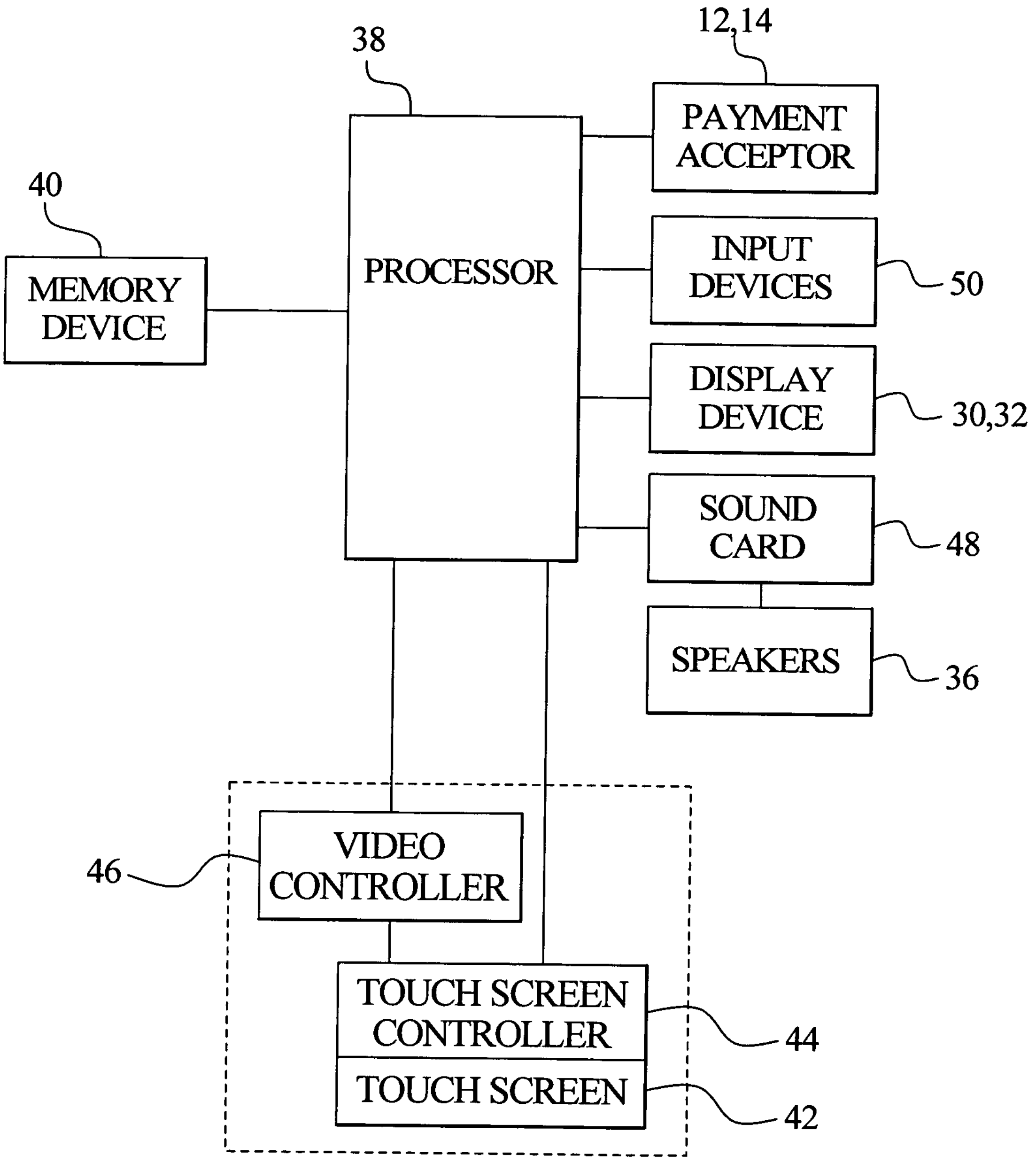
FIG. 2A is a schematic block diagram of the electronic configuration of one embodiment of the gaming device of the present invention.

In one embodiment, as illustrated in FIG. 2A, the gaming device preferably includes at least one processor 38, such as a microprocessor, a microcontroller-based platform, a suitable integrated circuit or one or more application-specific integrated circuits (ASIC's). The processor is in communication with or operable to access or to exchange signals with at least one data storage or memory device 40. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM). In one embodiment, the memory device includes read only memory (ROM). In one embodiment, the memory device includes flash memory and/or EEPROM (electrically erasable programmable read only memory). Any other suitable magnetic, optical and/or semiconductor memory may be implemented in conjunction with the gaming device of the present invention.

In one embodiment, part or all of the program code and/or operating data described above can be stored in a detachable or removable memory device, including, but not limited to, a suitable cartridge, disk or CD ROM. A player can use such a removable memory device in a desktop, a laptop personal computer, a personal digital assistant (PDA) or other computerized platform. The processor and memory device may be collectively referred to herein as a "computer" or "controller."

In one embodiment, as discussed in more detail below, the gaming device randomly generates awards and/or other game outcomes based on probability data. That is, each award or other game outcome is associated with a probability and the gaming device generates the award or other game outcome to be provided to the player based on the associated probabilities. In this embodiment, since the gaming device generates outcomes randomly or based upon a probability calculation, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device removes the provided award or other game outcome from the predetermined set or pool. Once removed from the set or pool, the specific provided award or other game outcome cannot be provided to the player again. This type of gaming device provides players with all of the available awards or other game outcomes over the course of the play cycle and guarantees the amount of actual wins and losses.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 30 which displays a primary game. This display device may also display any secondary game associated with the primary game as well as information relating to the primary or secondary game. The alternative embodiment shown in FIG. 1B includes a central display device 30 and an upper display device 32. Gaming device 10 in one embodiment displays a plurality of cards 34 in video form at one or more of the display devices. The display devices may include, without limitation, a monitor, a television display, a plasma display, a liquid crystal display (LCD) a display based on light emitting diodes (LED) or any other suitable electronic device or display mechanism. In one embodiment, as described in more detail below, the display device includes a touch-screen with an associated touch-screen controller. The display devices may be of any suitable configuration, such as a square, rectangle, elongated rectangle. because the cards 34 are in video form, the display device is preferably a video monitor. The cards 34 are associated with one or more decks of cards used in conventional poker games. The cards 34 may alternatively display a variety of images such as bells, hearts, fruits, numbers, letters or other images which may correspond to a theme associated with the gaming device 10.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, tournament advertisements and the like.

In one alternative embodiment, the symbols, images and indicia displayed on or of the display device may be in mechanical form. That is, the display device may include any electromechanical device, such as one or more physical cards or other mechanical objects, such as one or more rotatable wheels, reels or dice, configured to display at least one and preferably a plurality of game or other suitable images, symbols or indicia.

As illustrated in FIG. 2A, in one embodiment, the gaming device includes at least one payment acceptor 12, 14 in communication with the processor. As seen in FIGS. 1A and 1B, the payment acceptor may include a coin slot 12 and a payment, note or bill acceptor 14, where the player inserts money, coins or tokens. The player can place coins in the coin slot or paper money, ticket or voucher into the payment, note or bill acceptor. In other embodiments, devices such as readers or validators for credit cards, debit cards or credit slips could be used for accepting payment. In one embodiment, a player may insert an identification card into a card reader of the gaming device. In one embodiment, the identification card is a smart card having a programmed microchip or a magnetic strip coded with a player's identification, credit totals and other relevant information. In one embodiment, money may be transferred to a gaming device through electronic funds transfer. When a player funds the gaming device, the processor determines the amount of funds entered and the corresponding amount is shown on the credit or other suitable display as described above.

As seen in FIGS. 1A, 1B and 2A, in one embodiment the gaming device includes at least one and preferably a plurality of input devices 50 in communication with the processor. The input devices can include any suitable device which enables the player to produce an input signal which is read by the processor. In one embodiment, after appropriate funding of the gaming device, the input device is a game activation device, such as a pull arm (not shown) or a play button or deal button 20 which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, as shown in FIGS. 1A and 1B, one input device is a bet one button 24. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (18) which enables the player to bet the maximum wager permitted for a game of the gaming device.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching touch-screen at the appropriate places.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor 38. In one embodiment, the sound generating device includes at least one and preferably a plurality of speakers 36 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a player or other sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and that image can be incorporated into the primary and/or secondary game as a game image, symbol or indicia.

Gaming device 10 can incorporate any suitable wagering primary or base game. The gaming machine or device of the present invention may include some or all of the features of conventional gaming machines or devices. If the card game of the present invention is a bonus game, the primary or base game may comprise any suitable reel-type game, card game, number game or other game of chance susceptible to representation in an electronic or electromechanical form which produces a random outcome based on probability data upon activation from a wager. That is, different primary wagering games, such as video poker games, video blackjack games, video Keno, video bingo or any other suitable primary or base game may be implemented into the present invention.

In one embodiment, as illustrated in FIGS. 1A and 1B, a base or primary game may be a poker game wherein the gaming device enables the player to play a conventional game of video poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards 34 to hold via one or more input device, such as pressing related hold buttons 26 or via the touch screen 42. The player then presses the deal button 20 and the unwanted or discarded cards 34 are removed from the display 30 and replacement cards 34 are dealt from the remaining cards in the deck. This results in a final five-card hand. The final five-card hand 34 is compared to a payout table which utilizes conventional poker hand rankings to determine the winning hands. The player is provided with an award based on a winning hand and the credits the player wagered.

In another embodiment, the base or primary game may be a multi-hand version of video poker. In this embodiment, the player is dealt at least two hands of cards 34. In one such embodiment, the cards are the same cards. In one embodiment each hand of cards is associated with its own deck of cards. The player chooses the cards to hold in a primary hand. The held cards 34 in the primary hand are also held in the other hands of cards 34. The remaining non-held cards 34 are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one and preferable a plurality of the selectable indicia or numbers via an input device or via the touch screen. The gaming device then displays a series of drawn numbers to determine an amount of matches, if any, between the player's selected numbers and the gaming device's drawn numbers. The player is provided an award based on the amount of matches, if any, based on the amount of determined matches.

In one embodiment, in addition to winning credits in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game.

In one embodiment, the bonus or secondary game may be any type of suitable game, either similar to or completely different from the base or primary game. In one embodiment, the gaming device includes a program which will automatically begin a bonus round when the player has achieved a triggering event or qualifying condition in the base or primary game. In one embodiment, the triggering event or qualifying condition may be a selected outcome in the primary game or a particular arrangement of one or more indicia on a display device in the primary game. In another embodiment, the triggering event or qualifying condition may be by exceeding a certain amount of game play (number of games, number of credits, amount of time), reaching a specified number of points earned during game play or as a random award.

In one embodiment, once a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or geometric increase in the number of bonus wagering credits awarded. In one embodiment, extra bonus wagering credits may be redeemed during the bonus game to extend play of the bonus game.

In one embodiment, no separate entry fee or buy in for a bonus game need be employed. That is, a player may not purchase an entry into a bonus game; he must win or earn entry through play of the primary game and, thus, play of the primary game is encouraged. In another embodiment, qualification of the bonus or secondary game could be accomplished through a simple "buy in" by the player if, for example, the player has been unsuccessful at qualifying through other specified activities.

Figure 2B:
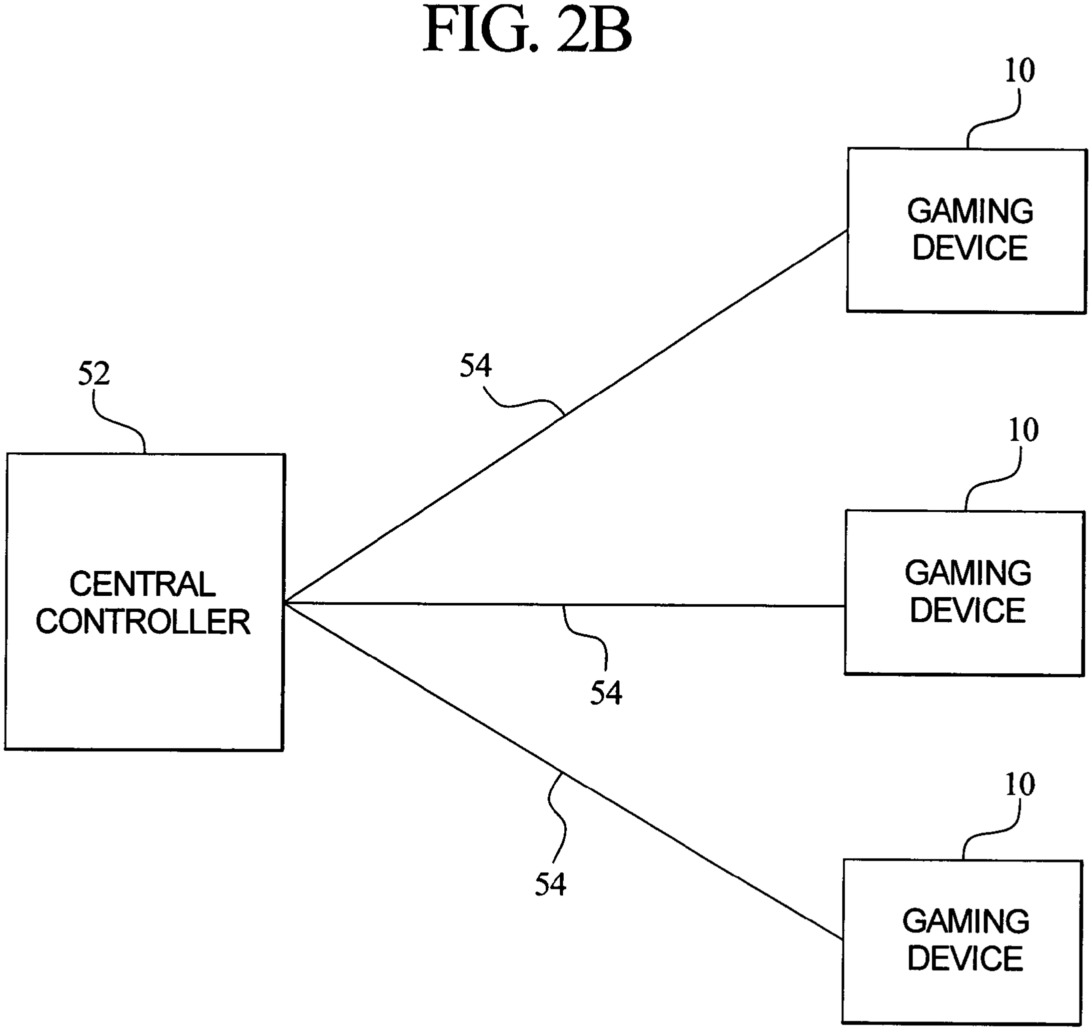
FIG. 2B is a schematic block diagram of a central determination embodiment of the gaming device of the present invention.

In one embodiment, as illustrated in FIG. 2B, one or more of the gaming devices 10 of the present invention may be connected to each other through a data network or a remote communication link 54 with some or all of the functions of each gaming device provided at a central location such as a central server or central controller 52. More specifically, the processor of each gaming device may be designed to facilitate transmission of signals between the individual gaming device and the central server or controller.

In one embodiment, the game outcome provided to the player is determined by a central server or controller and provided to the player at the gaming device of the present invention. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such a free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, one or more of the gaming devices of the present invention are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

A plurality of the gaming devices of the present invention are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system of the present invention may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital signal line (DSL), T-1 line, coaxial cable, fiber optic cable, or other suitable connection. In this embodiment, players may access an Internet game page from any location where an internet connection and computer, or other internet facilitator are available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications according to the present invention, particularly if such communications are encrypted. Higher data transmission speeds may be useful for enhancing the sophistication and response of the display and interaction with the player.

In another embodiment, a plurality of gaming devices at one or more gaming sites may be networked to a central server in a progressive configuration, as known in the art, wherein a portion of each wager to initiate a base or primary game may be allocated to bonus or secondary event awards. In one embodiment, a host site computer is coupled to a plurality of the central servers at a variety of mutually remote gaming sites for providing a multi-site linked progressive automated gaming system. In one embodiment, a host site computer may serve gaming devices distributed throughout a number of properties at different geographical locations including, for example, different locations within a city or different cities within a state.

In one embodiment, the host site computer is maintained for the overall operation and control of the system. In this embodiment, a host site computer oversees the entire progressive gaming system and is the master for computing all progressive jackpots. All participating gaming sites report to, and receive information from, the host site computer.

Each central server computer is responsible for all data communication between the gaming device hardware and software and the host site computer.

In another embodiment of the present invention, multiple sets or decks of cards are used for central determination gaming. In central determination, individual game terminals receive randomly generated outcomes from central or server processors. For example, in slot each symbol has a probability of being displayed on the reels after the reels have been spun. The odds of any particular symbol combination being displayed when the reels stop spinning is therefore a combination of the component symbols. In known gaming, the player's outcome is determined randomly by the combination of symbols generated.

With central determination the outcome is generated randomly at the host computer and a set of symbols yielding the outcome is displayed at the gaming terminal. Central determination provides the player with a combination of symbols that appears to generate the generated outcome. For games of pure luck, such symbol generation is facilitated readily because the player has no control. With games like poker, however, which require a degree of strategy and decision making, providing the symbols necessary to generate a previously, randomly determined outcome can become tricky.

In one draw poker embodiment, all winning cards of a predetermined and centrally determined hand are dealt face-up and initially. That prevents the player from keeping losing cards, precluding the player from obtaining the winning cards from a draw. If the player discards any of the initially dealt face-up cards, the gaming device or initial processor provides another winning card in the draw to yield ultimately the predetermined win. For example, if a royal flush is randomly predetermined for and dealt initially to player, and the player foolishly discards the king for a draw card, the king of the same suit is provided to the player from the draw and from the second deck of cards. In that way, the player wins the randomly predetermined result, e.g., the royal flush regardless of the discarded winning card.

The Negative Impact Card

In one embodiment of the present invention, at least one negative impact card is included in the cards of a poker game, wherein the negative impact card takes the place of a card that could contribute to a winning combination by not being part of any winning combination of cards. Such a card decreases the probability of obtaining a winning combination and changes the strategy from a five-card to a four-card game when the card is drawn or dealt and cannot be discarded. In a two-pair or better five-card draw poker game with a standard fifty-two card deck and two wild card jokers, the chances of obtaining a winning hand are 0.36 or 1 in every 2.8 hands. However, if a non-discardable negative impact card replaces one of the wild card jokers such that, when dealt, the player has only four cards to generate a winning hand, the probability of obtaining a winning hand is reduced to 0.28 or 1 in every 3.6 hands. Likewise, a discardable negative impact card which is not revealed until after the draw also has a probability of obtaining a winning hand of 0.28 or 1 in every 3.6 hands.

Referring now to FIG. 3, an example of a paytable of one embodiment presents different known combinations of cards associated with a distribution of different award amounts. In addition, the table illustrates the number of cards needed for each winning combination. For example, a Royal Flush, Straight Flush, Full House, Flush, and Straight require five cards for the player to achieve each combination. When a negative impact card is dealt or drawn, and only four cards are considered in determining a winning combination, only the combinations of Four-of-a-Kind, Three-of-a-Kind, Two Pairs, and a Pair of Aces require less than five cards and are available to the player.

Figure 4A:
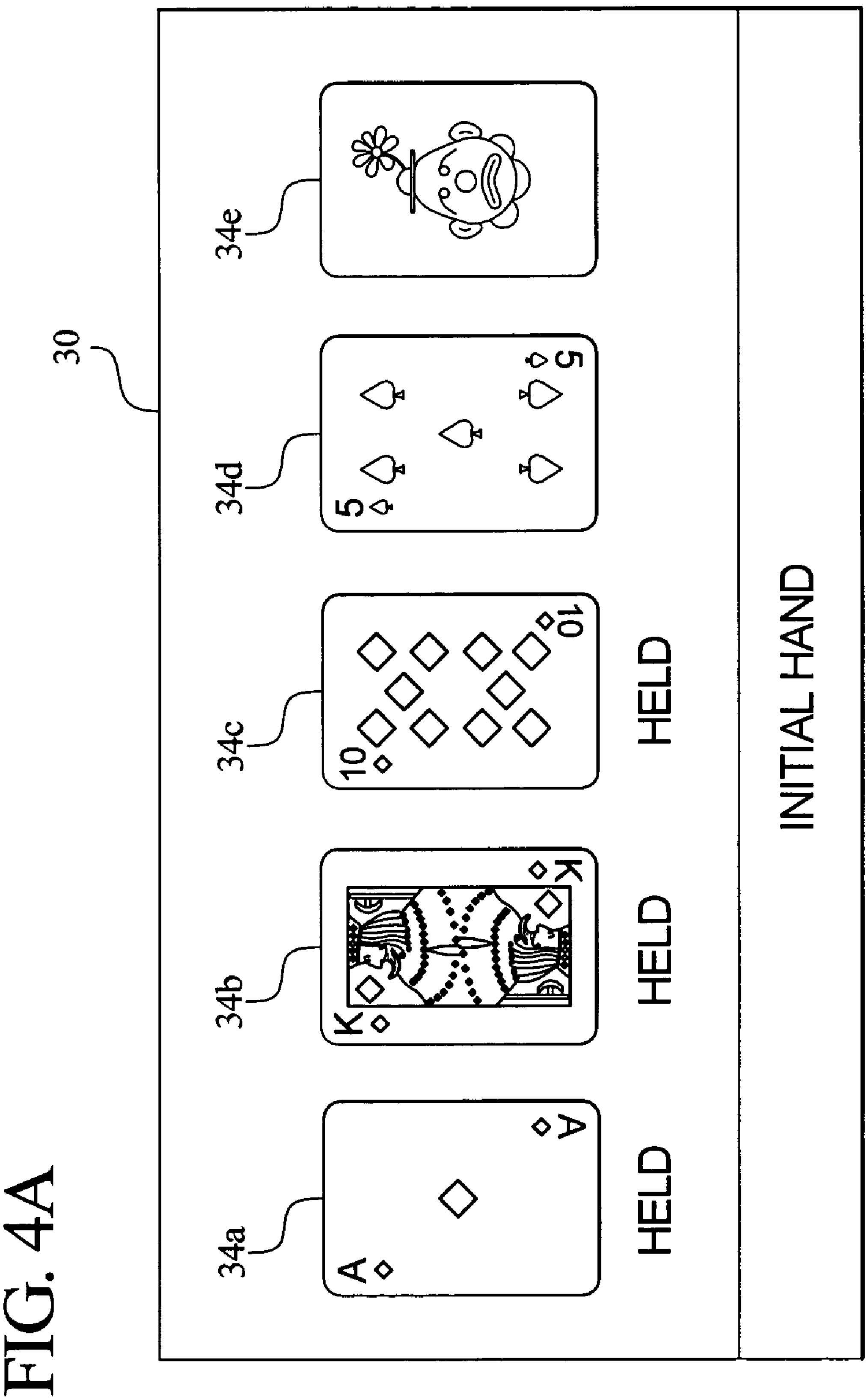
FIG. 4A is an enlarged front elevation view of one of the display devices of FIGS. 1A and 1B illustrating one embodiment of the present invention wherein the player is dealt an initial hand.
Figure 4B:
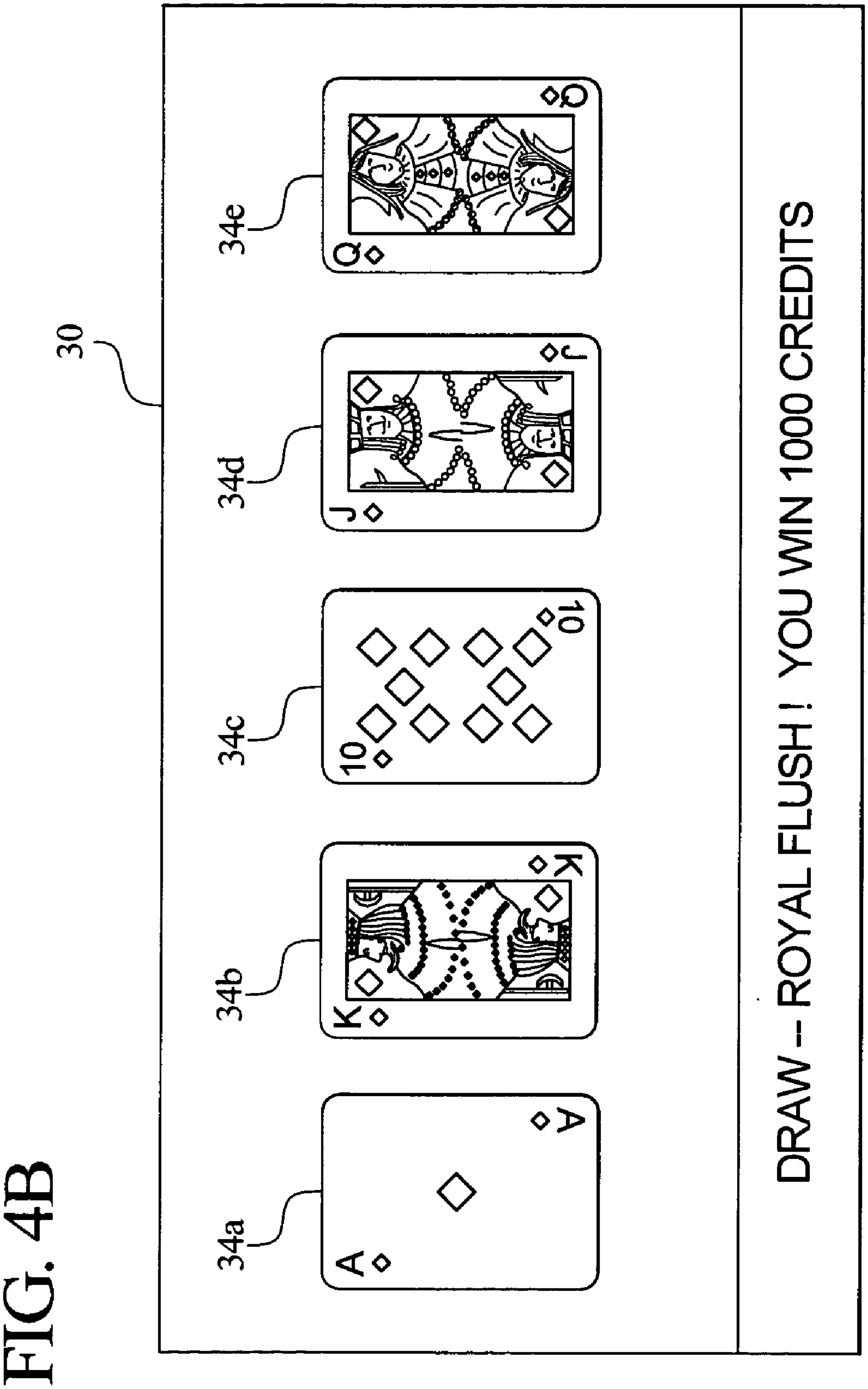
FIG. 4B is an enlarged front elevation view of one of the display devices of FIGS. 1A and 1B illustrating one embodiment of the present invention after the player receives a draw.

Referring now to FIGS. 4A and 4B, in one embodiment of the present invention, the negative impact card is used in a draw poker game in the form of a Joker card, hereinafter referred to as a Negative Joker. In one embodiment, all cards, including the negative impact card(s), are able to be discarded for the draw. In FIG. 4A, an Ace of Diamonds 34*a*, a King of Diamonds 34*b*, a Ten of Diamonds 34*c*, a Five of Spades 34*d* and a Negative Joker 34*e* are dealt to the player. This combination of cards is not a winning hand, even with the four cards other than the Negative Joker 34*e*. The hand, however, has three cards to a winning combination which, in this embodiment, is a Royal Flush. In the embodiment which allows the player to replace undesirable cards including the Negative Joker, the player holds the Ace of Diamonds 34*a*, the King of Diamonds 34*b*, the Ten of Diamonds 34*c* and requests a draw. The gaming device 10 subsequently discards the Negative Joker 34*e* along with the Five of Spades 34*d*, and deals two additional cards including a Jack of Diamonds 34*f* and a Queen of Diamonds 34*g* as illustrated in FIG. 4B. The player now holds the winning combination, a Royal Flush, and the player wins an award of 1000 credits according to the paytable of FIG. 3.

Figure 5A:
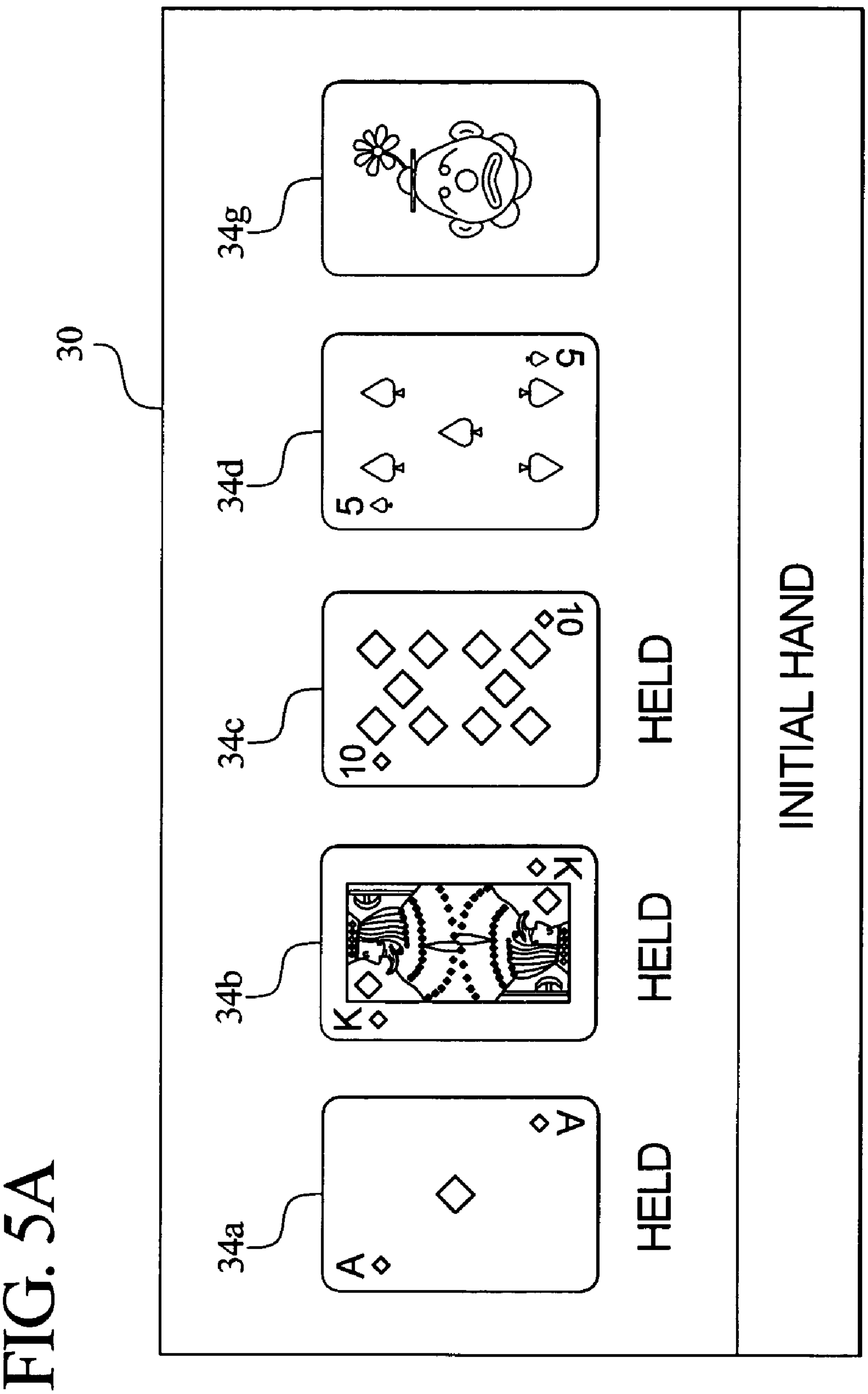
FIG. 5A is an enlarged front elevation view of one of the display devices of FIGS. 1A and 1B illustrating one embodiment of the present invention wherein the player is dealt an initial hand.
Figure 5B:
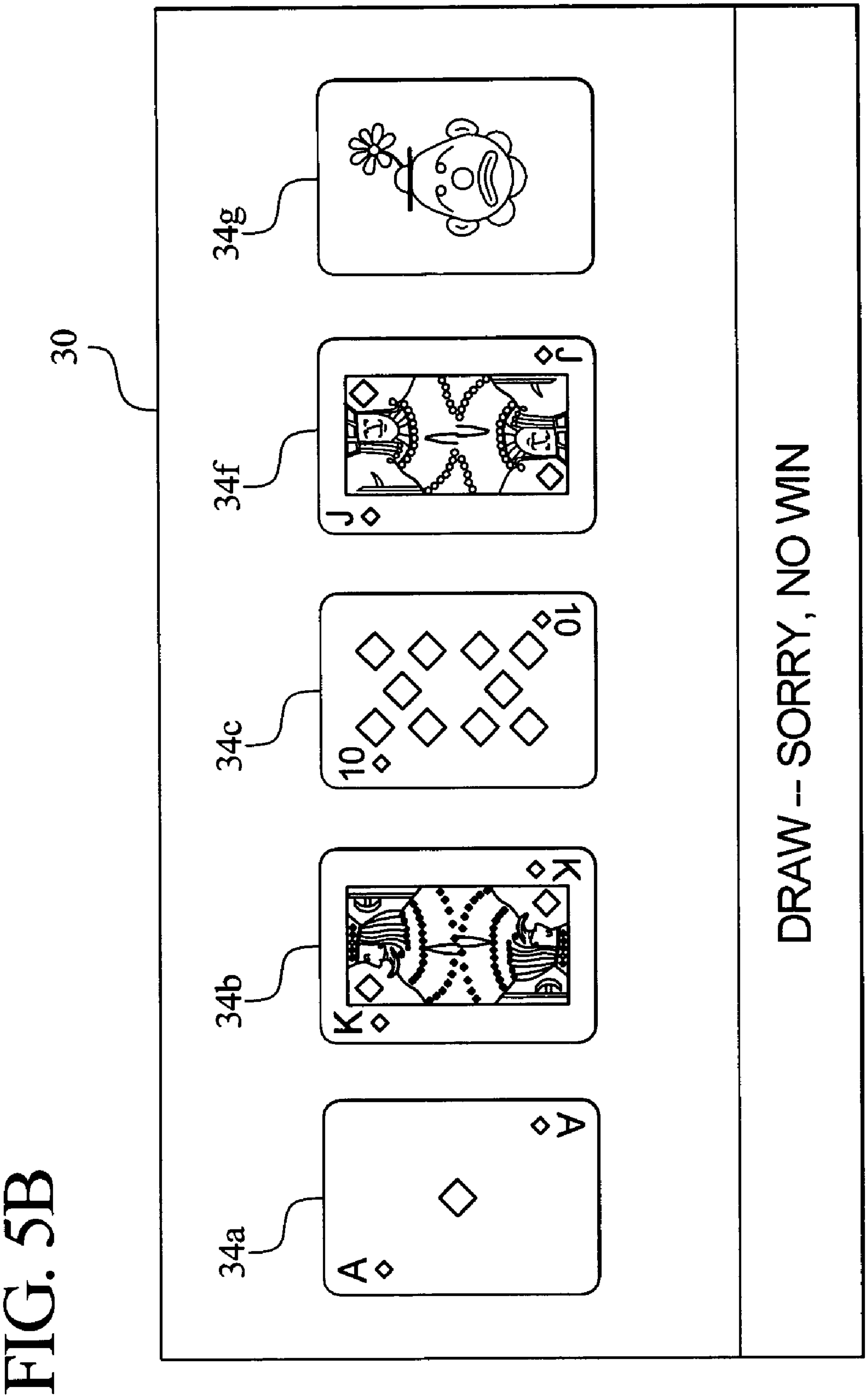
FIG. 5B is an enlarged front elevation view of one of the display devices of FIGS. 1A and 1B illustrating one embodiment of the present invention after the player receives a draw.

In one alternative embodiment of a draw poker game, the player may not discard or exchange the negative impact card even in the first draw. Referring now to FIGS. 5A and 5B, an embodiment of the present invention is illustrated where, in a conventional five-card video poker game, the player has been dealt an initial hand including an Ace of Diamonds 34*a*, a King of Diamonds 34*b*, a Ten of Diamonds 34*c*, a Five of Spades 34*d* and a negative Joker or negative impact card 34*g*. This is not a winning hand, but the hand has three cards to a winning combination which, in this example, is a Royal Flush. However, the player cannot discard the negative impact card 34*g*. The player holds the Ace of Diamonds 34*a*, the King of Diamonds 34*b*, the Ten of Diamonds 34*c* and requests a draw. The gaming device discards the Five of Spades 34*d* but does not discard the negative impact card or negative joker 34*g*. The gaming device selects and deals one additional card which is a Jack of Diamonds 34*f* as illustrated in FIG. 5B. The player now holds four cards to a Royal Flush and the Negative Joker 34*g*. The final evaluation is made by the game, and the player does not win because the player does not have a winning hand based on the four remaining cards.

Figure 6A:
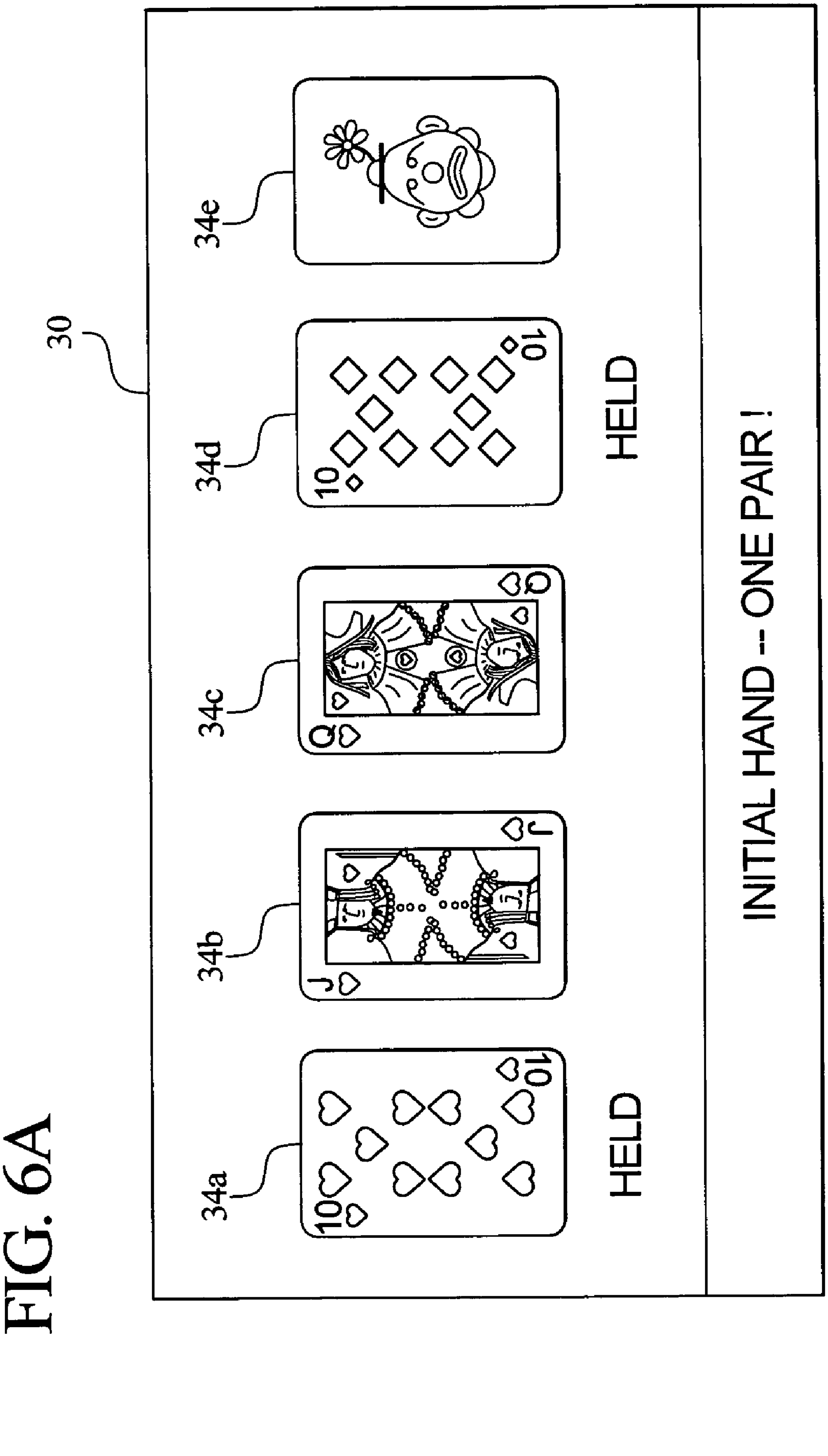
FIG. 6A is an enlarged front elevation view of one of the display devices of FIGS. 1A and 1B illustrating one embodiment of the present invention wherein the player is dealt an initial hand which is a winning hand of Two Pairs.
Figure 6B:
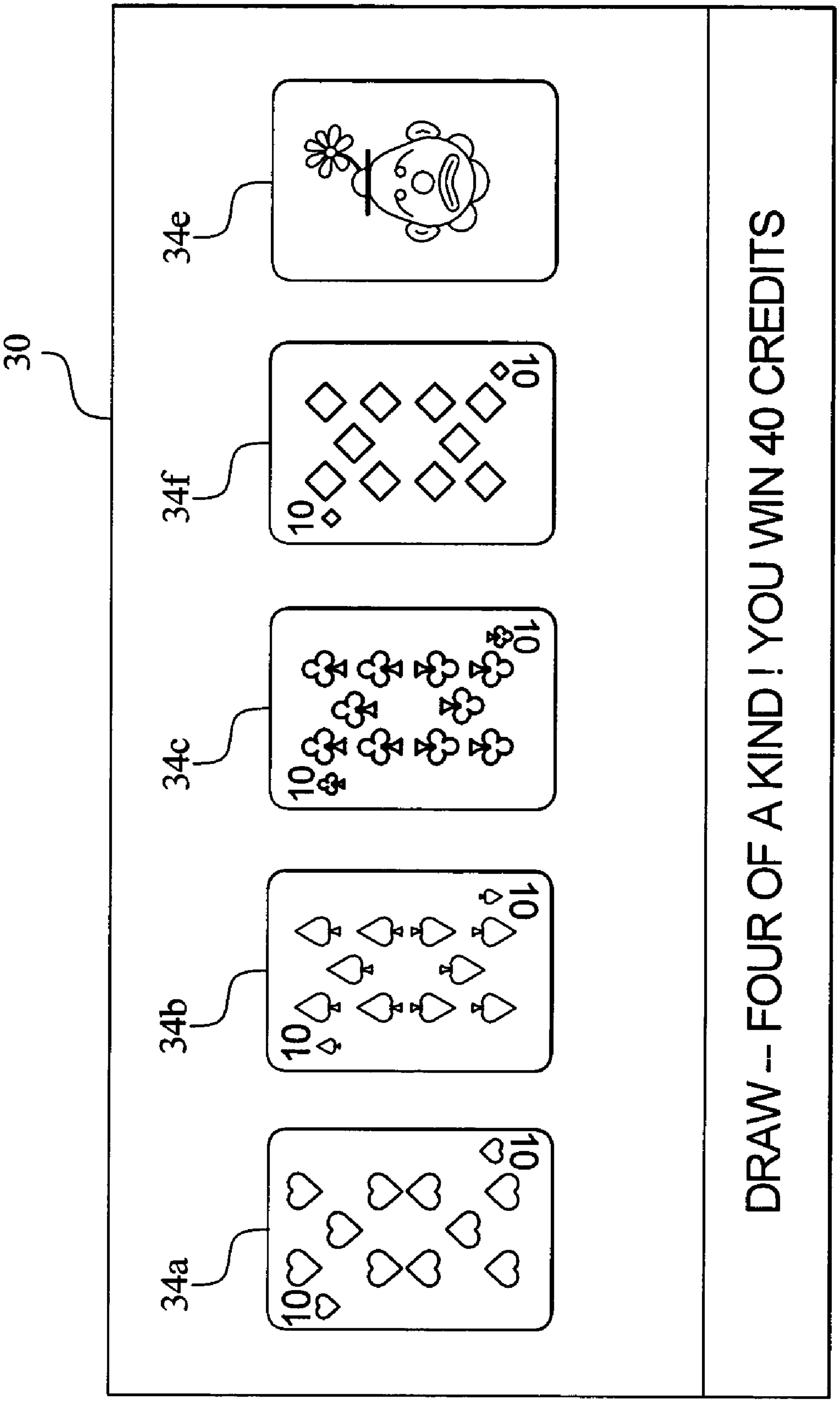
FIG. 6B is an enlarged front elevation view of one of the display devices of FIGS. 1A and 1B illustrating one embodiment of the present invention after the player receives a draw.

It should be appreciated that in this embodiment a player must shift from a five card game strategy to a four-card game strategy when dealt a negative impact card in the first draw. In other words, when determining whether to hold or discard certain cards, instead of building a winning hand requiring five cards, such as a Straight, Flush, Full House, Straight Flush or Royal Flush, the player must play for a winning combination requiring only four cards such as a Four-of-a-Kind, Three-of-a-Kind, etc. The player in FIG. 6A, for example, has received a hand of a Ten of Hearts 34*a*, a Jack of Hearts 34*b*, a Queen of Hearts 34*c*, a Ten of Diamonds 34*d*, and a Negative Joker 34*e*. This combination of cards is three cards to the five-card winning combination which, in this example, is a Royal Flush. However, in the embodiment where the negative impact card cannot be discarded, the player must give up the chance at the greater award associated with the five-card winning combination and play for the four-card win of Four-of-a-Kind. The player subsequently holds the Ten of Hearts 34*a* and the Ten of Diamonds 34*d*, and discards the Jack of Hearts 34*b*, and Queen of Hearts 34*c* with the hope of drawing a Ten of Spades and a Ten of Clubs to obtain the Four-of-a-Kind. As illustrated in FIG. 6B, the game cooperates with the player's desire and provides the cards needed for Four-of-a Kind-a winning combination demonstrating that a player, in one embodiment, still has the opportunity to win an award when dealt a negative impact card which cannot be discarded. It should be appreciated that a negative impact card, in one embodiment, decreases the probability of obtaining a winning hand in the game but does not eliminate the possibility of obtaining a high award associated with combinations such as a Four-of-a-Kind.

Referring now to FIGS. 7A, 7B, 8A and 8B, in one embodiment of the present invention, the deck of cards includes at least one positive impact card and at least one negative impact card or jokers which can be discarded but will not be indicated as a positive or negative impact card when either is dealt to the player. Both the positive impact card and the negative impact card will appear the same to the player when dealt. In one embodiment, whether the impact card is a positive or negative impact card is not revealed to the player until after the draw or until the player has chosen to keep or discard the card. The two divergent effects a positive and a negative impact card will have on the player's hand must be considered by the player when determining which of the cards, if any, is discarded or held, including the positive or negative impact card. In the embodiment illustrated in FIGS. 7A and 8A, the initial hand dealt to the player includes a Four of Hearts 34*a*, a Four of Clubs 34*b*, a Four of Spades 34*c*, a Seven of Diamonds 34*d*, and a Joker 34*e*. This combination of cards, in one embodiment, is a Three-of-a-Kind win. In addition, this combination of cards is four cards to the more desirable five-card winning combination which, in this example, is a Full House or three cards to the four-card winning combination which, in this example, is Four-of-a-Kind. In this embodiment, the Joker can be a positive impact card which, if held, would automatically result in a win as a Full House and Four-of-a-Kind due to its wild card status. Alternatively, the Joker can be a negative impact card which, if held, would only result in the Three-of-a-Kind win if all of the other cards are held. The player must, therefore decide whether to play the hand as if the Joker 34*e* is a positive impact card or a negative impact card.

Figure 7A:
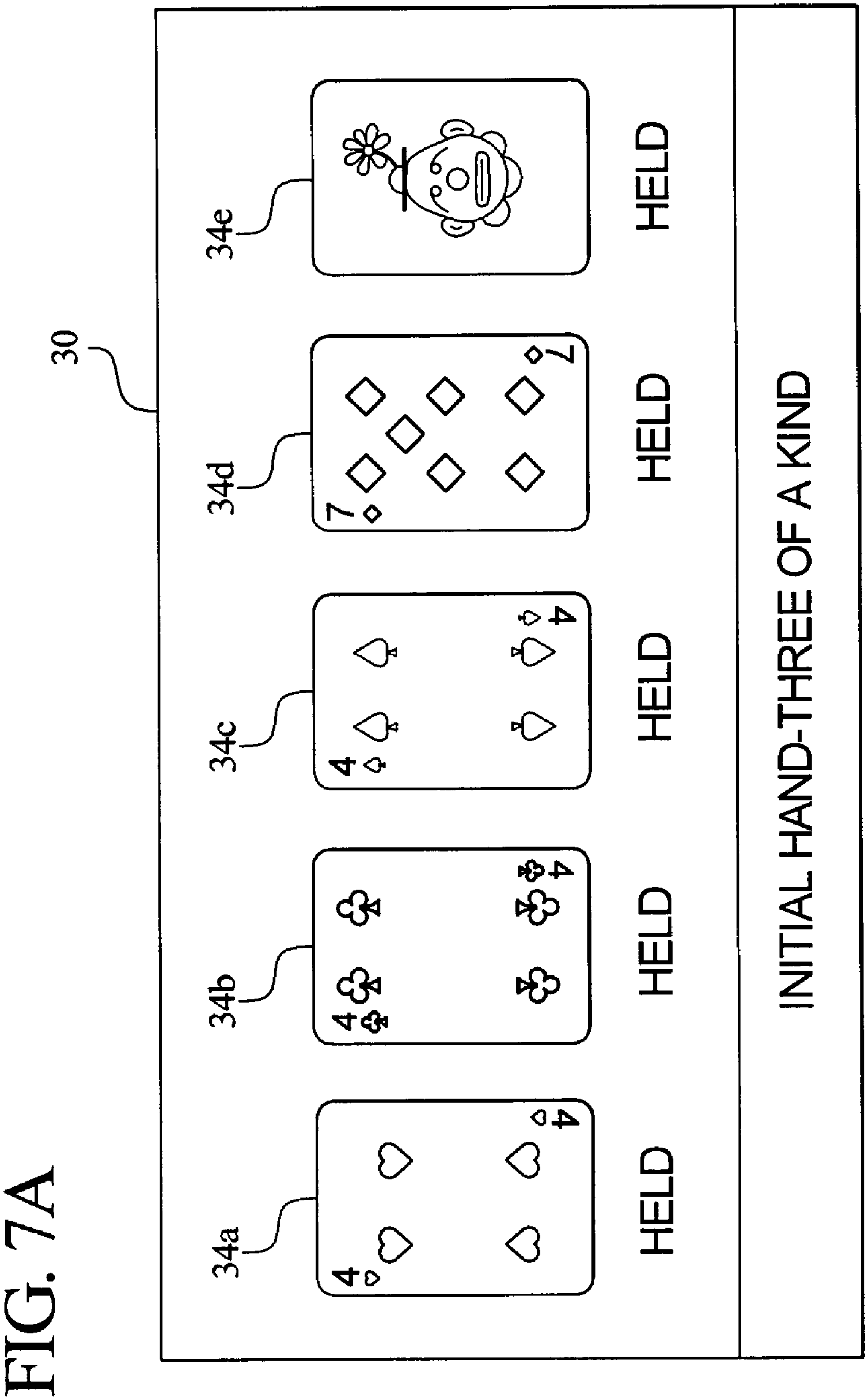
FIG. 7A is an enlarged front elevation view of one of the display devices of FIGS. 1A and 1B illustrating one embodiment of the present invention wherein the player is dealt an initial hand which is a winning hand of Three-of-a-Kind.
Figure 7B:
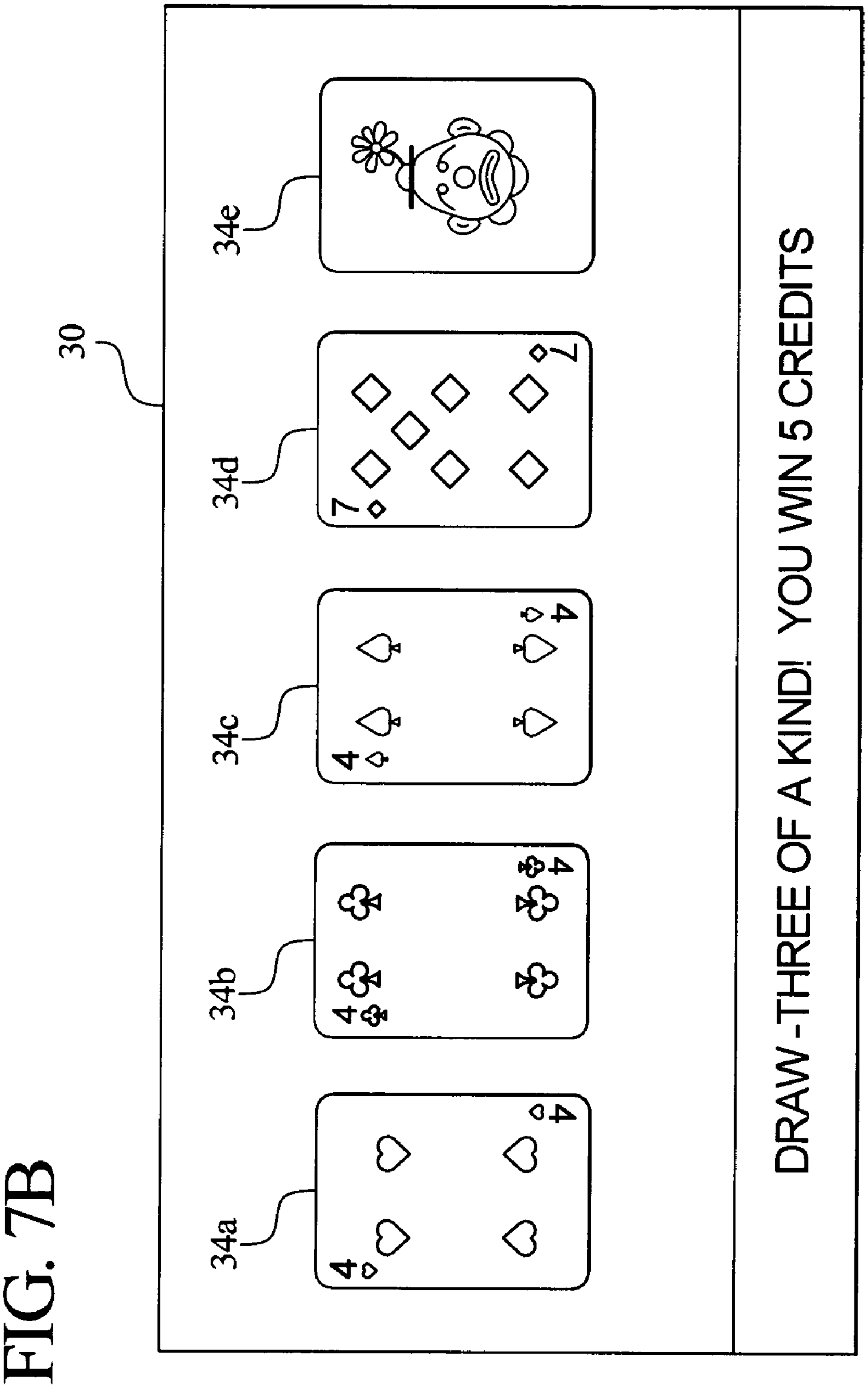
FIG. 7B is an enlarged front elevation view of one of the display devices of FIGS. 1A and 1B illustrating one embodiment of the present invention after the player receives a draw.

In FIG. 7A, the player plays the hand as if the Joker 34*e* is a positive impact card and plays for a Full House and Four-of-a-Kind. The player subsequently holds all the cards including the Joker 34*e*. In FIG. 7B, the status of the Joker is revealed to the player to be a negative impact card and the player has no win other than Three-of-a-Kind in the initial hand. Because the player held the Seven of Diamonds 34*d* to play for the Full House and Four-of-a-Kind, the player gave up the chance of playing for Four-of-a-Kind (by drawing a Four of Diamonds) if the Joker was a negative impact card.

Figure 8A:
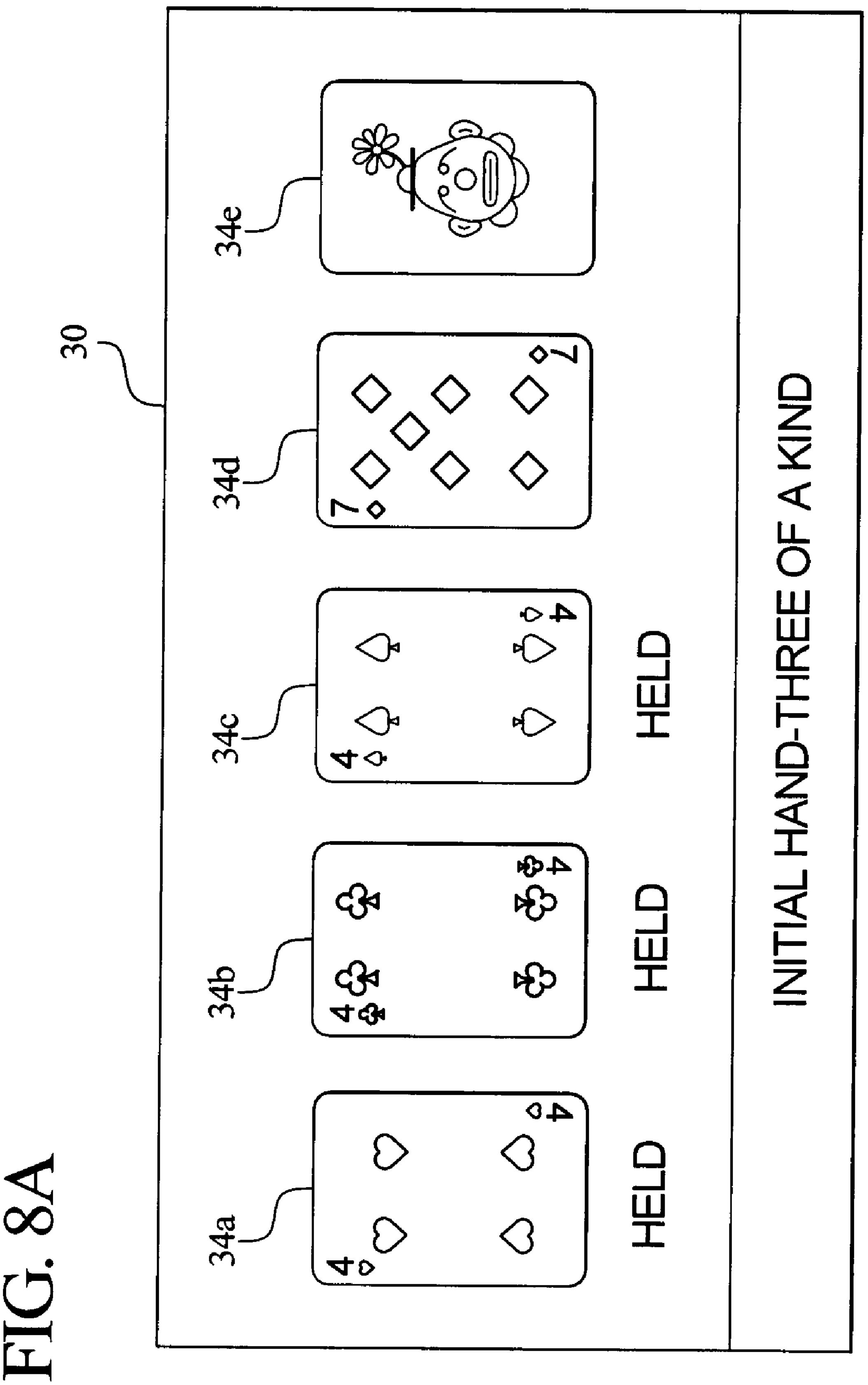
FIG. 8A is an enlarged front elevation view of one of the display devices of FIGS. 1A and 1B illustrating one embodiment of the present invention wherein the player is dealt an initial hand which is a winning hand of Three-of-a-Kind.
Figure 8B:
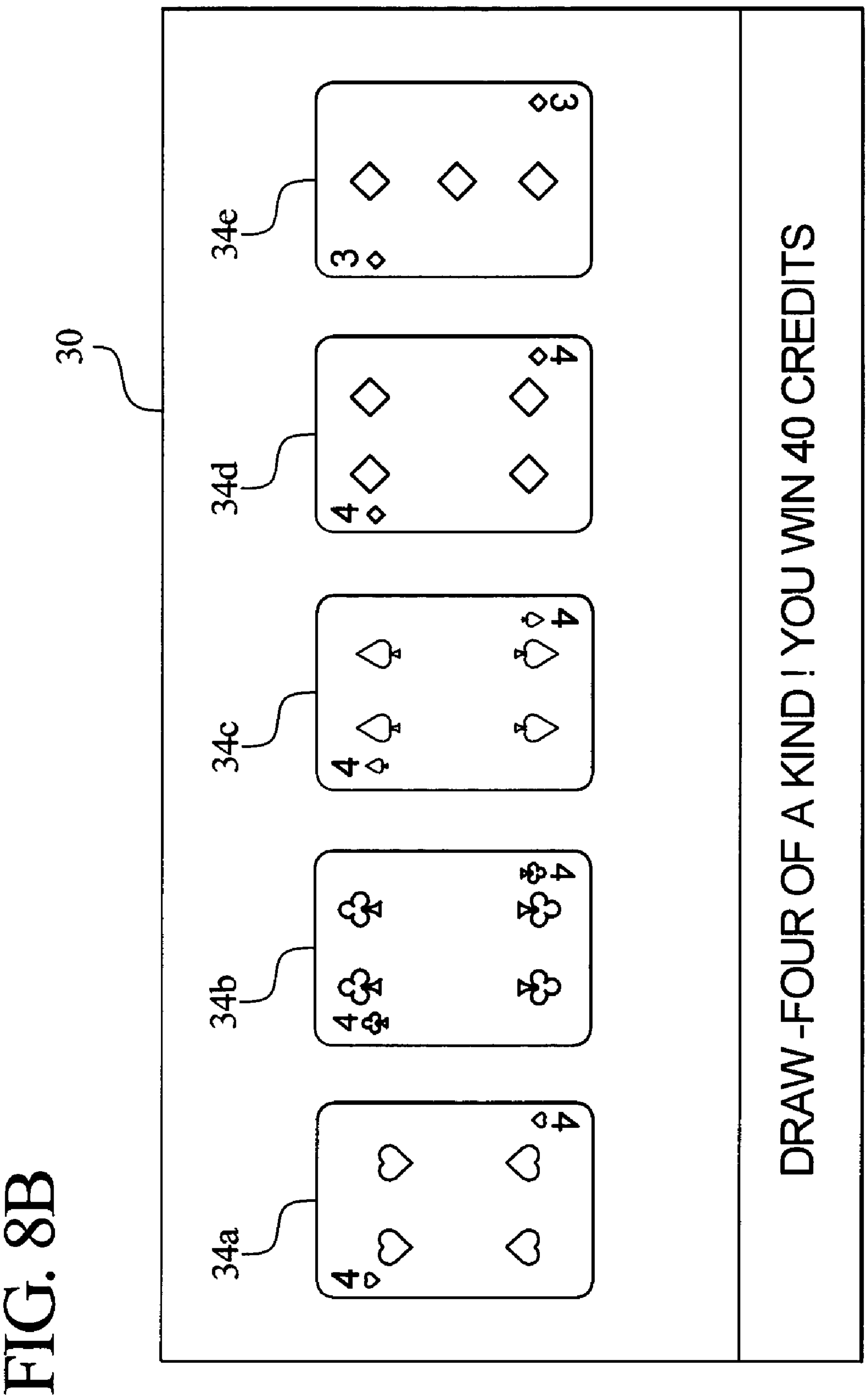
FIG. 8B is an enlarged front elevation view of one of the display devices of FIGS. 1A and 1B illustrating one embodiment of the present invention after the player receives a draw.

In the embodiment illustrated in FIG. 8A, the player plays the hand as if the Joker 34*e* is a negative impact card and plays for Four-of-a-Kind. The player subsequently discards the Seven of Diamonds 34*d* and the Joker 34*e* to have two chances to be dealt the fourth card of Four-of-a-Kind, the Four of Diamonds. In FIG. 8B, the player receives a winning hand on the draw of Four-of-a-Kind. It should be appreciated that if the discarded Joker 34*e* had been a positive impact card, the player would have completed Four-of-a-Kind and would have lost any award associated with drawing a Full House by discarding the Seven of Diamonds 34*d*. In an embodiment where the player is provided an award for each winning combination of cards, the player would have lost the opportunity of winning multiple awards associated with the multiple winning combinations of the cards of the initial hand which included a positive impact card.

Figure 9A:
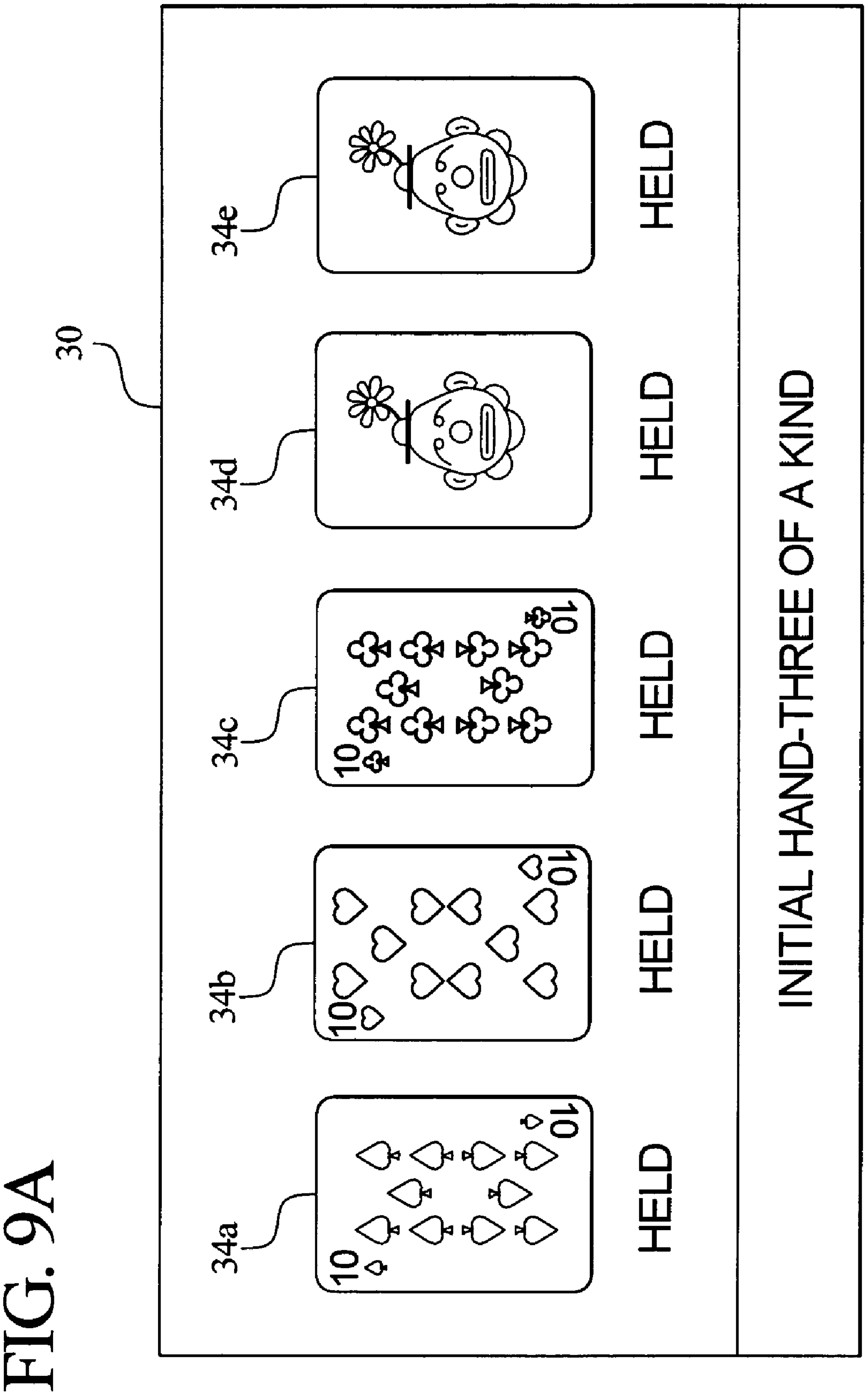
FIG. 9A is an enlarged front elevation view of one of the display devices of FIGS. 1A and 1B illustrating one embodiment of the present invention wherein the player is dealt an initial hand which is a winning hand of Three-of-a-Kind.
Figure 9B:
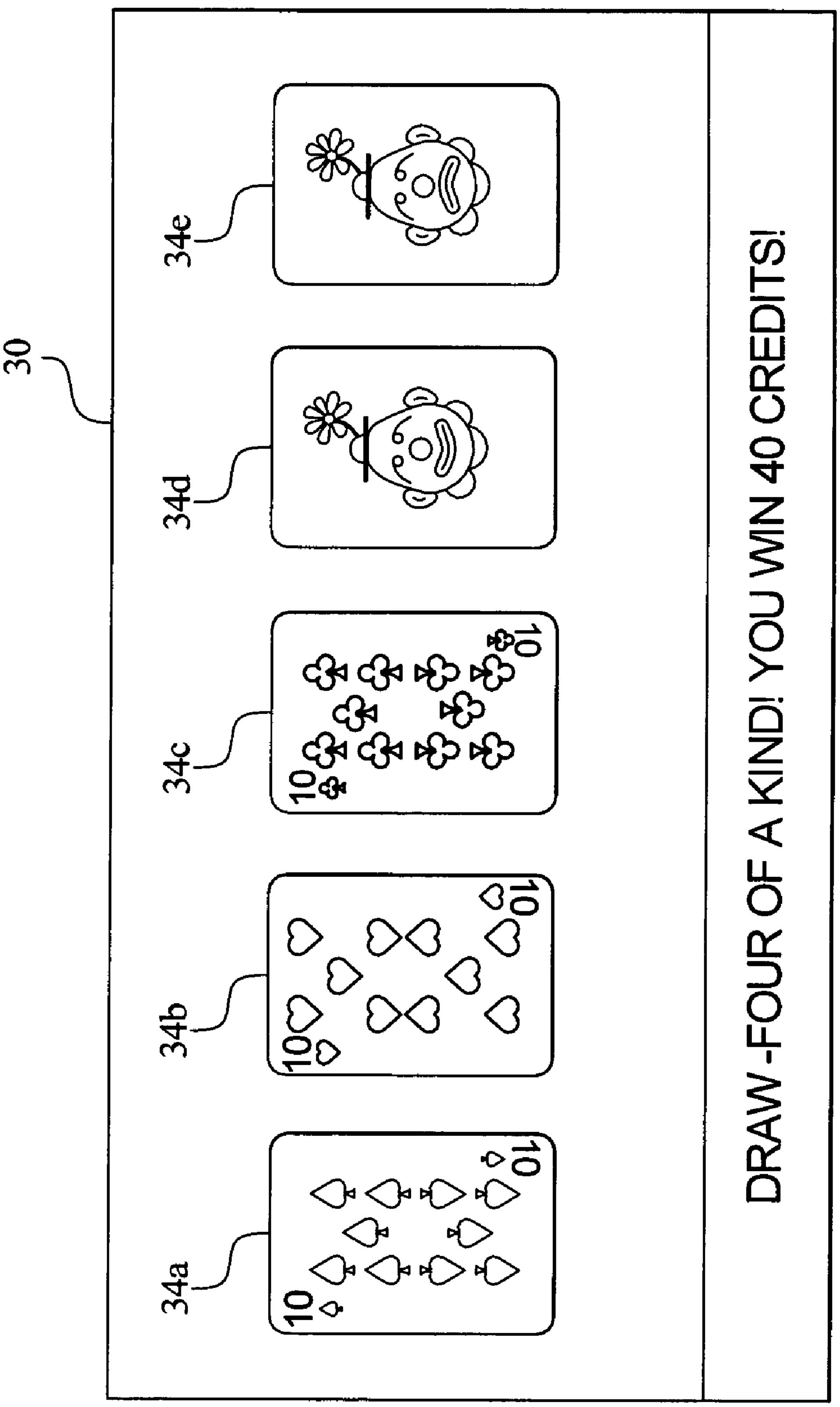
FIG. 9B is an enlarged front elevation view of one of the display devices of FIGS. 1A and 1B illustrating one embodiment of the present invention after the player receives a draw.
Figure 11:
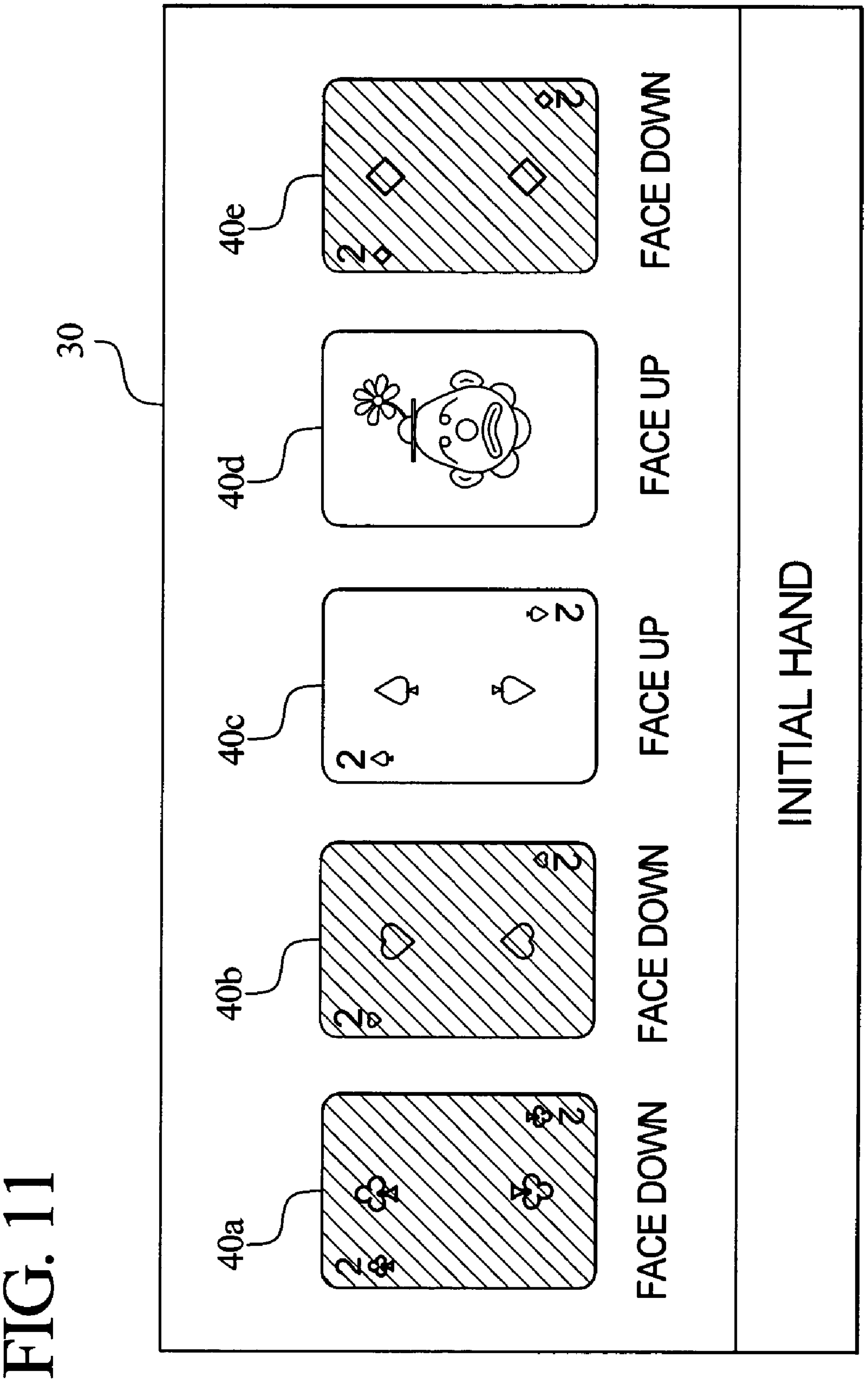
FIG. 11 is an enlarged front elevation view of one embodiment of the present invention after the player is dealt an initial hand wherein some cards are dealt face-down and other cards are dealt face-up.

It should be appreciated that the player may be dealt both positive impact and negative impact cards in a single hand in the game. In the embodiment illustrated in FIGS. 9A and 9B, the initial hand dealt to the player includes a Ten of Hearts 34*a*, a Ten of Clubs 34*b*, a Ten of Spades 34*c*, and two Jokers 34*d* and 34*e*. This combination of cards, in one embodiment, is a Three-of-a-Kind win. In addition, this combination of cards is three cards to the more desirable four-card winning combination which, in this example, is Four-of-a-Kind. In FIG. 9B, in an embodiment where there are only two Jokers, one a positive impact card and the other, a negative impact card, the player holds all of the cards to preserve the chance of winning a Four-of-a-Kind with one of the Jokers 34*d* or 34*e*. As illustrated in FIG. 9B, the player holds a winning hand when it is revealed that one of the Jokers is a positive impact card completing Four-of-a-Kind.

In different embodiments in the draw poker game of the present invention, the player is allowed to discard the negative impact card based on the initial bet in the game or the placement of an additional bet. In another embodiment, the player may discard a negative impact card if the player has not exceeded a maximum or threshold number of discards in the game. Additionally, the gaming device may randomly select the negative impact card to be discarded.

In one embodiment, the ability to discard a negative impact card can depend on the amount the player bet in the game. In one embodiment, the poker game enables the player to discard a negative impact card at least once if the player bet the maximum amount. It should be appreciated that basing the ability to discard a card on the amount of the player's bet may be applied only to the negative impact card or, alternatively, to the other cards in the game or, alternatively, to all the cards in the game. Hence, if the player bets the amount required to discard the negative impact card, the player may discard the negative impact card as illustrated in FIGS. 4A and 4B. Likewise, if the player does not bet max or the amount necessary to be able to discard the negative impact card, the player retains the negative impact card and plays the best four of the five dealt or drawn cards as illustrated in FIGS. 6A and 6B.

In an alternative embodiment, the ability to discard the negative impact card depends on an additional bet required by the game to exchange the negative impact card. In one embodiment, the player is allowed to discard the negative impact card only if an additional wager is made or if an additional wager exceeds a predetermined threshold amount required by the game.

An example of a wager schedule of one embodiment of the present invention is illustrated in the table of FIG. 7. The wager schedule provides the amount of the additional wager necessary, in one embodiment, for a player to discard the negative impact card and other cards not desired by the player. The wager schedule of FIG. 7 in comparison with the paytable of FIG. 3, illustrates that if the player replaces all five cards of the initial hand or five cards over a plurality of rounds, the player needs to achieve at least Four-of-a-Kind to win more than the player has wagered (40 versus 32 credits). If the player replaces a negative impact card, four cards of the initial hand or four cards over a plurality of rounds, the player needs to achieve at least a Flush in order to win more than the player has wagered (20 versus 16 credits). If the player replaces three cards of the initial hand or three cards over a plurality of rounds, the player needs to obtain at least a Straight in order to win more credits than the player has wagered (10 versus 8 credits). If the player replaces two cards of the initial hand or two cards over a plurality of rounds, the player needs to achieve Three-of-a-Kind in order to win more than the player has wagered (5 versus 4 credits). If the player replaces only one card of the initial hand or one card over a plurality of rounds, the player needs to achieve at least Two Pairs in order to win more than the player has wagered (3 versus 2 credits). If the player decides not to replace any cards, the player needs to achieve at least a Pair of Aces in order to win more than the player has wagered. It should be appreciated that those skilled in the art could modify the wager schedule of FIG. 8 without departing from the scope of the present invention.

In one embodiment, only discarding the negative impact card requires an additional wager amount. In one embodiment, the amount of the additional wager required to discard a negative impact card is greater than the amount required to discard other cards of the deck of cards. It should be appreciated that the amount of the additional wager to discard the negative impact card may vary from the amount of discarding other cards in any suitable manner and can be more, less or the same as the amount of the wager necessary to replace other cards as desired by the game implementer. As illustrated in the wager schedule of FIG. 8, the game allows the player to discard the negative impact card if the player is willing to wager an additional sixteen credits. The player is faced with a dilemma in a situation as in FIG. 5B where the player is four cards to a Royal Flush. A sixteen-credit wager for the chance to potentially win an award of 1000 credits associated with the Royal Flush in this embodiment may be a tempting choice for the player.

In an alternative embodiment, the additional wager required to discard and exchange the negative impact card may be based on how close the player is to obtaining a winning combination or winning a particular award. In FIG. 4A, for example, the player is four cards to a Royal Flush, a card combination associated with the highest award amount. In one embodiment, the additional wager required to discard the negative impact card in such a situation is greater than the wager required if the player was holding three cards to a Royal Flush as in FIG. 6A, for example.

In one embodiment, the game or dealer removes any discarded cards from the game. In an alternative embodiment, the game or the dealer returns the discarded cards into the deck where they can be re-drawn by the player. In a draw poker game, for example, if the player is required to discard the negative impact card back into the deck, it should be appreciated that the player could receive the negative impact card again on the next draw.

In an alternative embodiment, the negative card is used in a game having multiple rounds of discarding and betting where the player is able to continue to replace other undesirable cards after the first draw. In such a game, the player may be holding and not discarding certain cards in anticipation of building a winning hand. If the player draws a negative impact card which cannot be discarded, the player must switch from a five-card game strategy to a four-card game strategy as illustrated in FIGS. 5A, 5B, 6A and 6B.

In one embodiment of a game with multiple rounds, the player is permitted to discard the negative impact card under certain conditions, i.e. limited number of cards, an additional wager, etc. In one embodiment, the player is permitted to discard a limited number of cards in all the rounds. In another embodiment, the player is permitted to discard a decreasing number of cards in each round such as two cards in the first round, one card in the next round, and no cards in any round thereafter.

In an alternative embodiment of the present invention, the negative impact card is included in a traditional five-card stud poker game. In a traditional five-card stud poker game, the player is not allowed to discard any undesirable card. Therefore, the player in a five-card stud poker game who receives a negative impact card will be playing to achieve the best possible combination of four cards rather than five cards. It should thus be appreciated that in a conventional poker game, the best combination a player who has been dealt a negative impact card can achieve is Four-of-a-Kind.

In a table poker game, in one embodiment of a stud poker game, some of the cards are dealt face-up so that the competing players know if one or more of the players receive a negative impact card. This knowledge assists the players in determining their bets when each card is dealt. The negative impact card will decrease the number of possible combinations available to the player and decrease the probability of obtaining a winning hand. In FIG. 8, for example, in one embodiment of a five-card stud table poker game, the dealer deals a Two of Clubs 82*a* and a Two of Hearts 82*b* to the player face down. However, the next two cards, a Two of Spades 82*c* and a Negative Joker 82*d*, in one embodiment, are dealt face up, thereby revealing the negative impact card to the other players. In such a situation, the other players can assume that the best hand that the player who was dealt the negative impact card can hold is a Four-of-a-Kind, a hand which can be beaten by a Straight Flush or Royal Flush. In contrast, when cards other than the negative impact card are revealed to the other players as they are dealt, the value of the cards to the player receiving them is more difficult to assess. Each card may be crucial to a winning hand regardless of its value; however, knowing that a player has a negative impact card and cannot discard the card in a stud poker game allows the other players to adjust their betting accordingly.

In the various embodiments, the game can include more than one negative impact card with the fifty-two card deck(s). The player receiving the negative impact card face up in a stud poker game, for instance, may not be the only player holding a negative impact card. It should be appreciated that the other players may have been dealt a negative impact card face down which is not revealed to the other players. It should also be appreciated that, in such a situation, a player who has not been dealt a negative impact card who is otherwise holding a competitive hand will be more confident in raising the ante on the other players assuming a high likelihood that at least one of the other players is holding a negative impact card.

It should be appreciated that the present invention could be employed in both single-hand and multi-hand versions of video poker games. The strategy of other types of poker games such as seven-card stud where multiple cards are dealt face-up and multiple rounds of betting occur based on those cards, will be dramatically affected by the presence of one or more negative impact cards.

Various embodiments of the present invention may also utilize a different number of cards than in conventional poker games.

It should be appreciated that the present invention can be played without the use of a gaming device, such as in a conventional table poker game.

It should be appreciated that the present invention could be used in card games other than poker.

Moreover, while the embodiments described herein are implemented in a video gaming machine in one preferred embodiment, the game may also be played over an internet or live at a casino or other gaming establishment.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A method of operating a poker game, said method comprising:

(a) receiving an initial wager from a player;

(b) dealing a hand to the player including a first plurality of cards from a deck of cards, wherein said deck of cards includes fifty-two standard cards, at least one positive impact card and at least one negative impact card, wherein if at least one of the positive or negative impact cards is in the hand, not revealing to the player whether said card is a positive impact card or a negative impact card;

(c) revealing to the player whether any remaining positive or negative impact cards in the hand are one of the positive impact cards or one of the negative impact cards after the player has caused a replacement, if any, of at least one of the first plurality of cards;

(d) evaluating the cards in the hand; and (e) providing an award to the player if the hand includes a winning combination of cards, wherein, if at least one of the negative impact cards is in the hand, the negative impact card cannot be part of any winning combination.

2. The method of claim 1, wherein dealing the hand to the player includes dealing at least one of the first plurality of cards in the hand face-up to the player.

3. The method of claim 1, wherein dealing the hand to the player includes dealing a plurality of the first plurality of cards in the hand face-up to the player.

4. The method of claim 1, wherein dealing the hand to the player includes dealing all of the first plurality of cards in the hand face-up to the player.

5. The method of claim 1, which includes enabling the player to cause the replacement of the at least one of the first plurality of cards with at least one other card from the deck of cards.

6. The method of claim 5, wherein enabling the player to cause the replacement of the at least one of the first plurality of cards includes enabling the player to cause the replacement of any of said first plurality of cards including any negative impact cards if said negative impact cards are in said first plurality of cards.

7. The method of claim 5, wherein enabling the player to cause the replacement of at least one of the first plurality of cards includes enabling the player to cause the replacement of any of said first plurality of cards except the negative impact card if said negative impact card is one of said first plurality of cards.

8. The method of claim 1, which includes displaying whether a card is one of the positive impact cards or one of the negative impact cards after the player has caused the replacement, if any, of the at least one of the first plurality of cards with the at least one other card from the deck of cards.

9. The method of claim 1, including randomly determining whether the card is one of the positive impact cards or one of the negative impact cards.

10. The method of claim 1, which includes replacing at least one of the first plurality of cards with at least one other card from the deck of cards.

11. The method of claim 10, wherein replacing the at least one of the first plurality of cards includes displaying at least one of the replacement cards face-up to the player.

12. The method of claim 10, wherein the replacement of the at least one of the first plurality of cards includes returning the replaced card to the deck of cards.

13. The method of claim 1, wherein the winning combination of cards includes at least one of the results selected from the group consisting of: one pair, two pairs, three-of-a-kind, a straight, a flush, a full house, four-of-a-kind, a straight flush and a royal flush.

14. The method of claim 1, which is operated via a data network.

15. The method of claim 14, wherein the data network is an internet.

16. The method of claim 1, wherein the cards are virtual and are adapted to be displayed by a display device of a gaming machine.

17. The method of claim 1, wherein computer instructions for implementing steps (a) to (e) are stored on a memory device.

18. A method of operating a poker game, said method comprising:

(a) receiving an initial wager from a player;

(b) dealing a hand to the player including a first plurality of cards from a deck of cards, wherein said deck of cards includes at least one positive impact card and at least one negative impact card, wherein if at least one of the positive or negative impact cards is in the hand, not revealing to the player whether said card is a positive impact card or a negative impact card;

(c) enabling the player to cause a replacement of one or more of the first plurality of cards each for at least one other card from the deck of cards, wherein the player can cause the replacement of any impact cards if said impact cards are in said first plurality of cards;

(d) revealing to the player whether any remaining positive or negative cards in the hand are one of the positive impact cards or one of the negative impact cards after the player has caused the replacement, if any, of at least one of the first plurality of cards;

(e) evaluating the cards in the hand; and (f) providing an award to the player if the hand includes a winning combination of cards, wherein, if one of the negative cards is in the hand, the negative impact card cannot be part of any winning combination.

19. The method of claim 18, which includes displaying whether a card is one of the positive impact cards or one of the negative impact cards after the player has caused the replacement, if any, of the at least one of the first plurality of cards with the at least one other card from the deck of cards.

20. The method of claim 18, including randomly determining whether the card is one of the positive impact cards or one of the negative impact cards.

21. The method of claim 18, wherein dealing the hand to the player includes dealing at least one of the first plurality of cards in the hand face-up to the player.

22. The method of claim 18, wherein dealing the hand to the player includes dealing a plurality of the first plurality of cards in the hand face-up to the player.

23. The method of claim 18, wherein dealing the hand to the player includes dealing all of the first plurality of cards in the hand face-up to the player.

24. The method of claim 18, wherein the replacement of the at least one of the first plurality of cards includes returning the replaced card to the deck of cards.

25. The method of claim 18, wherein the replacement of the at least one of the first plurality of cards includes displaying at least one of the replacement cards face-up to the player.

26. The method of claim 18, wherein the winning combination of cards includes at least one of the results selected from the group consisting of: one pair, two pairs, three-of-a-kind, a straight, a flush, a full house, four-of-a-kind, a straight flush and a royal flush.

27. The method of claim 18, which is operated via a data network.

28. The method of claim 27, wherein the data network is an internet.

29. The method of claim 18, wherein the cards are virtual and are displayed by a display device of a gaming machine.

30. The method of claim 18, wherein computer instructions for implementing steps (a) to (f) are stored on a memory device.

31. A method of operating a poker game, said method comprising:

(a) receiving an initial wager from a player;

(b) dealing a hand to the player including a first plurality of cards from a deck of cards, wherein said deck of cards includes at least one positive impact card and at least one negative impact card;

(c) enabling the player to cause a replacement of at least one of the first plurality of cards except any impact card each for at least one other card from the deck of cards;

(d) revealing to the player whether any remaining positive or negative impact cards in the hand are one of the positive impact cards or one of the negative impact cards after the player has caused the replacement, if any, of the at least one of the first plurality of cards;

(e) evaluating the cards in the hand; and (f) providing an award to the player if the hand includes a winning combination of cards, wherein, if the negative impact card is in the hand, the negative impact card cannot be part of any winning combination.

32. The method of claim 31, wherein dealing the hand to the player includes dealing at least one of the first plurality of cards in the hand face-up to the player.

33. The method of claim 31, wherein dealing the hand to the player includes dealing a plurality of the first plurality of cards in the hand face-up to the player.

34. The method of claim 31, wherein dealing the hand to the player includes dealing all of the first plurality of cards in the hand face-up to the player.

35. The method of claim 31, wherein the replacement of the at least one of the first plurality of cards includes displaying at least one of the replacement cards face-up to the player.

36. The method of claim 31, wherein the winning combination of cards includes at least one of the results selected from the group consisting of: a pair, two pairs, three-of-a-kind, a straight, a flush, a full house, four-of-a-kind, a straight flush and a royal flush.

37. The method of claim 31, which is operated via a data network.

38. The method of claim 37, wherein the data network is an internet.

39. The method of claim 31, wherein the cards are virtual and are displayed by a display device of a gaming machine.

40. The method of claim 31, wherein computer instructions for implementing steps (a) to (f) are stored on a memory device.

41. The method of claim 31, which includes displaying whether the card is one of the positive impact cards or one of the negative impact cards after the player has caused the replacement, if any, of the at least one of the first plurality of cards with the at least one other card from the deck of cards.

42. The method of claim 31, including randomly determining whether the card is one of the positive impact cards or one of the negative impact cards.

43. The method of claim 31, wherein the replacement of the at least one of the first plurality of cards includes returning the replaced card to the deck of cards.

* * * * *